(12) United States Patent
Banshoya et al.

(10) Patent No.: US 9,481,235 B1
(45) Date of Patent: Nov. 1, 2016

(54) HYBRID VEHICLE

(71) Applicant: TOYOTA JIDOSHA KABUSHIKI KAISHA, Toyota-shi, Aichi-ken (JP)

(72) Inventors: Hidehiko Banshoya, Toyota (JP); Atsushi Tabata, Okazaki (JP); Toshiki Kanada, Anjo (JP); Haruhisa Suzuki, Nagoya (JP); Atsushi Kawamoto, Toyota (JP); Tatsuya Imamura, Okazaki (JP); Kiyonori Takagi, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/159,429

(22) Filed: May 19, 2016

(30) Foreign Application Priority Data

May 26, 2015 (JP) ................................. 2015-106324

(51) Int. Cl.
*B60K 6/442* (2007.10)
*B60K 6/445* (2007.10)
*B60W 20/00* (2016.01)

(52) U.S. Cl.
CPC ............... *B60K 6/442* (2013.01); *B60K 6/445* (2013.01); *B60W 20/20* (2013.01)

(58) Field of Classification Search
CPC ...... B60K 6/442; B60K 6/445; B60W 20/20
See application file for complete search history.

(56) References Cited

U.S. PATENT DOCUMENTS 9,216,641 B2 * 12/2015 Ono ...................... B60K 6/365
2015/0211620 A1 7/2015 Matsubara et al.

FOREIGN PATENT DOCUMENTS

WO 2013/114594 A1 8/2013
WO 2014/013556 A1 1/2014

* cited by examiner

*Primary Examiner* — John Walters
*Assistant Examiner* — James Triggs
(74) *Attorney, Agent, or Firm* — Oliff PLC

(57) ABSTRACT

A control device performs a control process such that when there is a request in a series/parallel mode to switch the current mode to a parallel mode, and the current speed ratio also has a value faster than a Lo rotation synchronization speed ratio, the control device performs the step of switching the running mode to the parallel mode via a series mode with asynchronous switching, whereas when the current speed ratio has a value slower than the Lo rotation synchronization speed ratio, the control device performs the step of switching the running mode to the parallel mode via the series mode with synchronous switching.

9 Claims, 18 Drawing Sheets

FIG.4

| | RUNNING STATE | | | | C1 | B1 | CS | MG1 | MG2 |
|---|---|---|---|---|---|---|---|---|---|
| E1 | EV RUNNING | FORWARD/ BACKWARD | SINGLE MOTOR | WHEN DRIVEN | × | × | × | | M |
| E2 | | | | WHEN ENGINE BRAKE IS APPLIED | △ | △ | × | M | G |
| E3 | | | DOUBLE MOTORS | Ne=0 | ○ | ○ | × | M | M |
| E4 | | | | Ne FREE / HIGH GEAR | × | ○ | ○ | M | M |
| E5 | | | | Ne FREE / LOW GEAR | ○ | × | ○ | M | M |
| H1 | HV RUNNING | SERIES/ PARALLEL | CONTINUOUS | HIGH GEAR | × | ○ | × | G | M |
| H2 | | | | LOW GEAR | ○ | × | × | G | M |
| H6 | | PARALLEL | FORWARD STEPPED | HIGH GEAR / SINGLE MOTOR | × | ○ | ○ | | M |
| H7 | | | | HIGH GEAR / DOUBLE MOTORS | × | ○ | ○ | M | M |
| H8 | | | | LOW GEAR / SINGLE MOTOR | ○ | × | ○ | | M |
| H9 | | | | LOW GEAR / SINGLE MOTOR | ○ | × | ○ | M | M |
| H3 | | SERIES/ PARALLEL | BACKWARD | LOW GEAR | ○ | × | × | G | M |
| H4 | | SERIES | FORWARD | | × | × | ○ | G | M |
| H5 | | | BACKWARD | | × | × | ○ | G | M |

○ : ENGAGED
△ : EITHER ONE IS ENGAGED WHEN ENGINE BRAKE IS USED IN COMBINATION
× : RELEASED
G : OPERATES MAINLY AS GENERATOR
M : OPERATES MAINLY AS MOTOR, BUT AS GENERATOR DURING REGENERATION

FIG.11 <HV RUNNING (SERIES/PARALLEL (Hi))>
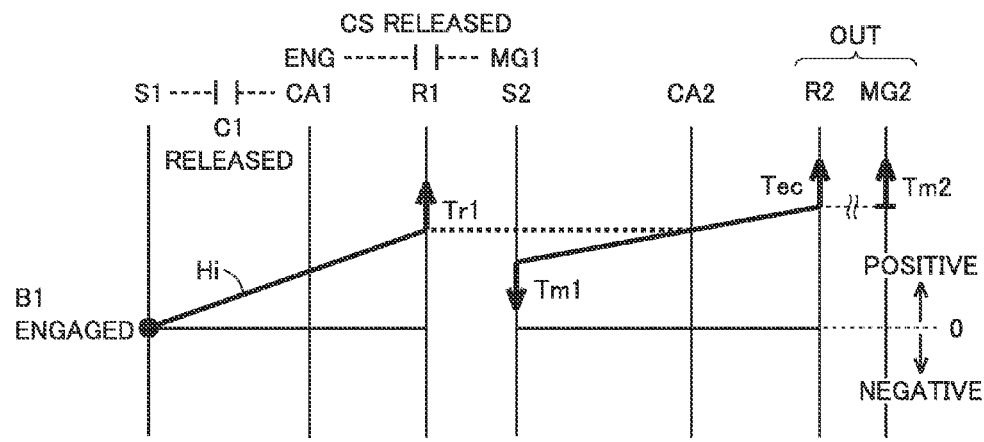
FIG.12
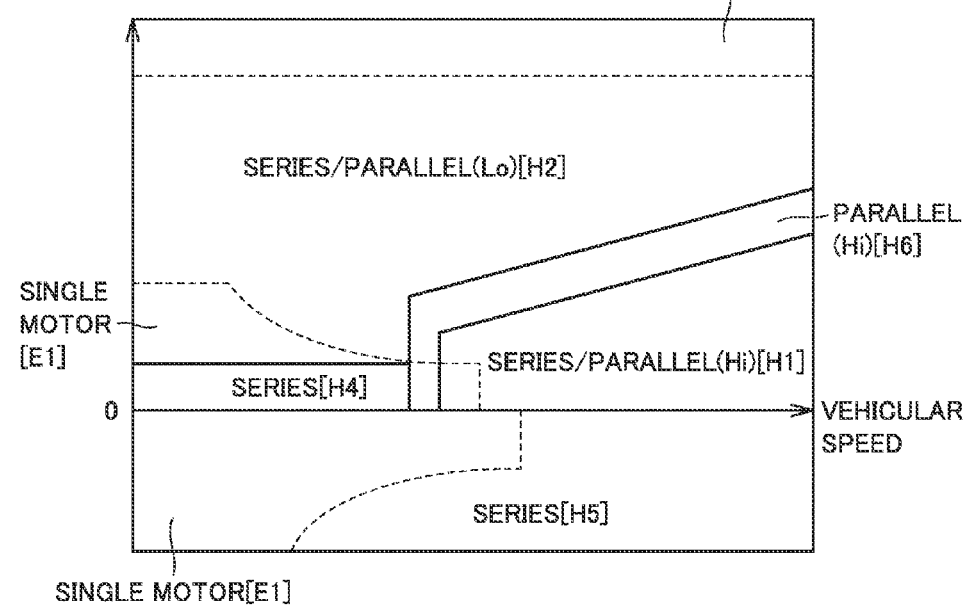

FIG. 14

| BEFORE SWITCHING | | | AFTER SWITCHING | SERIES (a) | SERIES/PARALLEL | | PARALLEL | |
|---|---|---|---|---|---|---|---|---|
| | | | | | Lo (b) | Hi (c) | Lo (d) | Hi (e) |
| SERIES (A) | | | C1 | | ×→○ | ○→× | ×→○ | × |
| | | | B1 | | × | × | × | ×→○ |
| | | | Cs | | ○→× | ×→○ | ○ | ○ |
| | | | Tg | | ○→○ | ○→○ | ○→× | ○→× |
| | | | sum | | 3 | 3 | 2 | 2 |
| | | | SYNCHRONIZATION | SYNCHRONIZATION | SYNCHRONIZABLE | SYNCHRONIZABLE | SYNCHRONIZABLE | SYNCHRONIZABLE |
| SERIES/ PARALLEL | Lo | (B) | C1 | ○→× | ○→× | ○→× | ○ | ○→× |
| | | | B1 | × | × | ×→○ | × | ×→○ |
| | | | Cs | ×→○ | ○→× | × | ×→○ | ×→○ |
| | | | Tg | ○○ | ○○ | ○○ | ○→× | ○→× |
| | | | sum | 3 | 3 | 3 | 2 | 4 |
| | | | SYNCHRONIZATION | SYNCHRONIZABLE | SYNCHRONIZABLE | SYNCHRONIZABLE | SYNCHRONIZABLE | NOT SYNCHRONIZABLE |
| | Hi | (C) | C1 | × | ×→○ | × | × | × |
| | | | B1 | ○→× | ○→× | ○ | ○ | ○ |
| | | | Cs | × | × | ○→× | ×→○ | ×→○ |
| | | | Tg | ○○ | ○○ | ○○ | ○→× | ○→× |
| | | | sum | 3 | 2 | 2 | 2 | 2 |
| | | | SYNCHRONIZATION | SYNCHRONIZATION | NOT SYNCHRONIZABLE | | SYNCHRONIZABLE | SYNCHRONIZABLE |
| PARALLEL | Lo | (D) | C1 | ○→× | ×→○ | ○→× | ×→○ | ○→× |
| | | | B1 | × | ○ | × | × | ×→○ |
| | | | Cs | ○ | ○→× | ○ | ○→× | ×→○ |
| | | | Tg | ○→× | ○→× | ○→× | ○→× | ○→× |
| | | | sum | 2 | 2 | 4 | 4 | 4 |
| | | | SYNCHRONIZATION | SYNCHRONIZABLE | NOT SYNCHRONIZABLE | NOT SYNCHRONIZABLE | NOT SYNCHRONIZABLE | NOT SYNCHRONIZABLE |
| | Hi | (E) | C1 | × | ×→○ | × | × | ×→○ |
| | | | B1 | ○ | ○ | ○ | ○ | ○ |
| | | | Cs | ○ | ○→× | ○→× | × | ×→○ |
| | | | Tg | ×→○ | ○→× | ×→○ | ○ | ○→× |
| | | | sum | 2 | 4 | 2 | 2 | |
| | | | SYNCHRONIZATION | SYNCHRONIZABLE | NOT SYNCHRONIZABLE | NOT SYNCHRONIZABLE | NOT SYNCHRONIZABLE | |

HYBRID VEHICLE

This nonprovisional application is based on Japanese Patent Application No. 2015-106324 filed on May 26, 2015, with the Japan Patent Office, the entire contents of which are hereby incorporated by reference.

BACKGROUND OF THE INVENTION

1. Field of the Invention

The present invention relates to a hybrid vehicle, and particularly to a hybrid vehicle including first and second rotating electric machines and a transmission unit.

2. Description of the Background Art

A hybrid vehicle is known that is configured to include, in addition to an engine, two rotating electric machines and a power split device, a transmission unit between the engine and the power split device.

SUMMARY OF THE INVENTION

The vehicle disclosed in WO2013/114594 adopts a series/parallel hybrid system. In the vehicle using the series/parallel hybrid system, motive power of the engine is transmitted to a first motor generator (first MG) to be used for generating electric power, while part of the motive power of the engine is transmitted to a driving wheel via the power split device.

A hybrid vehicle is also known that is configured to perform series running by generating electric power using the motive power of the engine, and driving the motors using the generated electric power (series hybrid system). With this series hybrid system, the motive power of the engine is not transmitted to the driving wheel.

The vehicle disclosed in the above-mentioned document has a configuration such that it cannot perform series running because, when the motive power of the engine is transmitted to the first motor generator (first MG), it is also transmitted to the driving wheel via the power split device.

With the series/parallel hybrid system, when the vehicular speed is low, for example, torque variations in the engine may cause rattling noise to be generated by a gear mechanism disposed in a drive device between the engine and the driving wheel. It is thus necessary to select an operating point of the engine to prevent generation of such rattling noise, and the engine is sometimes operated at an operating point not optimal in terms of fuel efficiency. Thus, there has been room for improvement in terms of fuel efficiency.

On the other hand, with the series system, the engine and the gear mechanism disposed in the drive device are completely decoupled from each other, without the need to take such rattling noise into much consideration. However, all the torque of the engine is converted to electric power once, and then converted back to a torque for the driving wheel by the motors. This makes the series system inferior to the series/parallel hybrid system in terms of fuel efficiency, within a range of speeds where the engine has good operating efficiency.

As described above, because the series/parallel hybrid system is superior to the series hybrid system in some ways, it would be desirable to have a configuration such that series running or series/parallel running can be selected depending on the conditions of the vehicle.

When series running and series/parallel running are switched using an engagement element such as a clutch, the running modes may be switched such that in addition to controlling the engagement of the clutch, the transmission unit may also be controlled to change speed. Thus, switching running modes such that an increased number of components are targets to be simultaneously controlled may complicate controlling the switching of the running modes.

An object of the present invention is to provide a hybrid vehicle allowing a clutch to be controlled to be engaged/disengaged and allowing a transmission unit to be controlled to change speed, as appropriate, in switching a running mode.

According to one aspect of the present invention, a hybrid vehicle comprises: an internal combustion engine; a first rotating electric machine; a second rotating electric machine configured to output motive power to a driving wheel; a transmission unit having an input element receiving motive power from the internal combustion engine and an output element outputting the motive power received by the input element, the transmission unit being configured to switch between a non-neutral state and a neutral state, in the non-neutral state motive power being transmitted between the input element and the output element via one shift position of a low speed position and a high speed position, in the neutral state motive power not being transmitted between the input element and the output element, and; a differential unit having a first rotation element connected to the first rotating electric machine, a second rotation element connected to the second rotating electric machine and the driving wheel, and a third rotation element connected to the output element, the differential unit being configured such that when rotation speeds of any two of the first to third rotation elements are determined, rotation speed of the remaining one rotation element is automatically determined. The hybrid vehicle is configured to transmit the motive power of the internal combustion engine via at least one of a first route and a second route, in the first route the motive power being transmitted from the internal combustion engine via the transmission unit and the differential unit to the first rotating electric machine, in the second route the motive power being transmitted from the internal combustion engine to the first rotating electric machine via a route other than the first route. The hybrid vehicle further comprises a clutch provided in the second route and configured to switch between an engaged state and a released state, in the engaged state the motive power being transmitted from the internal combustion engine to the first rotating electric machine, in the released state the motive power from the internal combustion engine to the first rotating electric machine being interrupted. The hybrid vehicle has a running mode including a series/parallel running mode placing the clutch in the released state and also placing the transmission unit in the non-neutral state, a parallel running mode placing the clutch in the engaged state and also placing the transmission unit in the non-neutral state, and a series running mode placing the clutch in the engaged state and also placing the transmission unit in the neutral state. The hybrid vehicle further comprises a control device configured to switch the running mode and the shift position via the series running mode when the running mode is switched between the series/parallel running mode and the parallel running mode and when the shift position is also switched between the low speed stage and the high speed stage.

Thus, when a running mode is switched between a series/parallel running mode and a parallel running mode and a shift stage is also switched between a low speed position and a high speed position, switching the running mode via a series running mode can suppress an increase in the number of control elements to be simultaneously controlled, as compared with switching the running mode and the shift position, and can thus facilitate speed change control.

Preferably, when a state in which the shift position of the low speed position is created in the series/parallel running mode is switched via the series running mode to a state in which the shift position of the high speed position is created in the parallel running mode, and furthermore, when a current running mode is the series/parallel running mode and the shift position of the low speed position is also created, and a current rotation speed ratio of the input element of the transmission unit and the second rotation element of the differential unit has a value slower than a first rotation speed ratio applied when the shift position of the low speed position is created in the parallel running mode, then, before switching the series/parallel running mode to the series running mode, the control device performs a control to synchronize the rotation speed ratio with the first rotation speed ratio, and after having switched the series/parallel running mode to the series running mode, the control device performs a control to synchronize the rotation speed ratio with a second rotation speed ratio applied when the shift position of the high speed position is created in the parallel running mode.

A control that is performed to synchronize with a first rotation speed ratio a rotation speed ratio provided before the current running mode is switched to the series running mode, and a control that is performed after the current running mode is switched to the series running mode to synchronize the rotation speed ratio with a second rotation speed ratio, allow the running mode and a shift position to be switched smoothly.

Still preferably, when a state in which the shift position of the high speed position is created in the series/parallel running mode is switched via the series running mode to a state in which the shift position of the low speed position is created in the parallel running mode, and furthermore, when a current running mode is the series/parallel running mode and the shift position of the high speed position is also created, and a current rotation speed ratio of the input element of the transmission unit and the second rotation element of the differential unit has a value faster than a first rotation speed ratio applied when the shift position of the high speed position is created in the parallel running mode, then, before switching the series/parallel running mode to the series running mode, the control device performs a control to synchronize the rotation speed ratio with the first rotation speed ratio, and after having switched the series/parallel running mode to the series running mode, the control device performs a control to synchronize the rotation speed ratio with a second rotation speed ratio applied when the shift position of the low speed position is created in the parallel running mode.

A control that is performed to synchronize with a first rotation speed ratio a rotation speed ratio provided before the current running mode is switched to the series running mode, and a control that is performed after the current running mode is switched to the series running mode to synchronize the rotation speed ratio with a second rotation speed ratio, allow the running mode and a shift position to be switched smoothly.

Still preferably, when a state in which the shift position of the low speed position is created in the series/parallel running mode is switched via the series running mode to a state in which the shift position of the high speed position is created in the parallel running mode, and furthermore, when a current running mode is the series/parallel running mode and the shift position of the low speed position is also created, and a current rotation speed ratio of the input element of the transmission unit and the second rotation element of the differential unit has a value faster than a first rotation speed ratio applied when the shift position of the low speed position is created in the parallel running mode, then, the control device switches the running mode from the series/parallel running mode to the series running mode without performing a control to synchronize the rotation speed ratio with the first rotation speed ratio before switching the running mode to the series running mode.

This can suppress an increase/decrease of a rotation speed ratio in switching a running mode. This can suppress deterioration of vehicular drivability.

Still preferably, when a state in which the shift position of the high speed position is created in the series/parallel running mode is switched via the series running mode to a state in which the shift position of the low speed position is created in the parallel running mode, and furthermore, when a current running mode is the series/parallel running mode and the shift position of the high speed position is also created, and a current rotation speed ratio of the input element of the transmission unit and the second rotation element of the differential unit has a value slower than a first rotation speed ratio applied when the shift position of the high speed position is created in the parallel running mode, then, the control device switches the running mode from the series/parallel running mode to the series running mode without performing a control to synchronize the rotation speed ratio with the first rotation speed ratio before switching the running mode to the series running mode.

This can suppress an increase/decrease of a rotation speed ratio in switching a running mode. This can suppress deterioration of vehicular drivability.

Still preferably, when a state in which the shift position of the low speed position is created in the parallel running mode is switched via the series running mode to a state in which the shift position of the high speed position is created in the series/parallel running mode, and furthermore, when a current running mode is the parallel running mode and the shift position of the low speed position is also created, and a target value of a rotation speed ratio of the input element of the transmission unit and the second rotation element of the differential unit has a value faster than a first rotation speed ratio applied when the shift position of the high speed position is created in the parallel running mode, then, while in the series running mode, the control device performs a control to synchronize the rotation speed ratio with the first rotation speed ratio, and after having switched the series running mode to the series/parallel running mode, the control device performs a control to change the rotation speed ratio to the target value.

A control performed to synchronize a rotation speed ratio with a first rotation speed ratio while in the series running mode, and a control performed to change the rotation speed ratio to a target value after the current running mode is switched to the series/parallel running mode, allow the running mode and a shift position to be switched smoothly.

Still preferably, when a state in which the shift position of the high speed position is created in the parallel running mode is switched via the series running mode to a state in which the shift position of the low speed position is created in the series/parallel running mode, and furthermore, when a current running mode is the parallel running mode and the shift position of the high speed position is also created, and a target value of a rotation speed ratio of the input element of the transmission unit and the second rotation element of the differential unit has a value slower than a first rotation speed ratio applied when the shift position of the low speed position is created in the parallel running mode, then, while in the series running mode, the control device performs a control to synchronize the rotation speed ratio with the first rotation speed ratio, and after having switched the series running mode to the series/parallel running mode, the control device performs a control to change the rotation speed ratio to the target value.

A control performed to synchronize a rotation speed ratio with a first rotation speed ratio while in the series running mode, and a control performed to change the rotation speed ratio to a target value after the current running mode is switched to the series/parallel running mode, allow the running mode and a shift position to be switched smoothly.

Still preferably, when a state in which the shift position of the low speed position is created in the parallel running mode is switched via the series running mode to a state in which the shift position of the high speed position is created in the series/parallel running mode, and furthermore, when a current running mode is the parallel running mode and the shift position of the low speed position is also created, and a target value of a rotation speed ratio of the input element of the transmission unit and the second rotation element of the differential unit has a value slower than a first rotation speed ratio applied when the shift position of the high speed position is created in the parallel running mode, then, the control device switches the running mode from the series running mode to the series/parallel running mode without performing a control to synchronize the rotation speed ratio with the first rotation speed ratio while in the series running mode.

This can suppress an increase/decrease of a rotation speed ratio in switching a running mode. This can suppress deterioration of vehicular drivability.

Still preferably, when a state in which the shift position of the high speed position is created in the parallel running mode is switched via the series running mode to a state in which the shift position of the low speed position is created in the series/parallel running mode, and furthermore, when a current running mode is the parallel running mode and the shift position of the high speed position is also created, and a target value of a rotation speed ratio of the input element of the transmission unit and the second rotation element of the differential unit has a value faster than a first rotation speed ratio applied when the shift position of the low speed position is created in the parallel running mode, then, the control device switches the running mode from the series running mode to the series/parallel running mode without performing a control to synchronize the rotation speed ratio with the first rotation speed ratio while in the series running mode.

This can suppress an increase/decrease of a rotation speed ratio in switching a running mode. This can suppress deterioration of vehicular drivability.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a diagram showing each running mode, as well as control states of a clutch C1 and a brake B1 of a transmission unit 40 in each running mode.

FIG. 11 is a nomographic chart in an HV running (series/parallel Hi) mode.

FIG. 12 is a mode determination map for determining a running mode when the hybrid vehicle runs mainly with fuel as an energy source.

FIG. 14 shows how targets to be controlled change between a running mode before switching and a running mode after switching.

DESCRIPTION OF THE PREFERRED EMBODIMENTS

Figure 1:
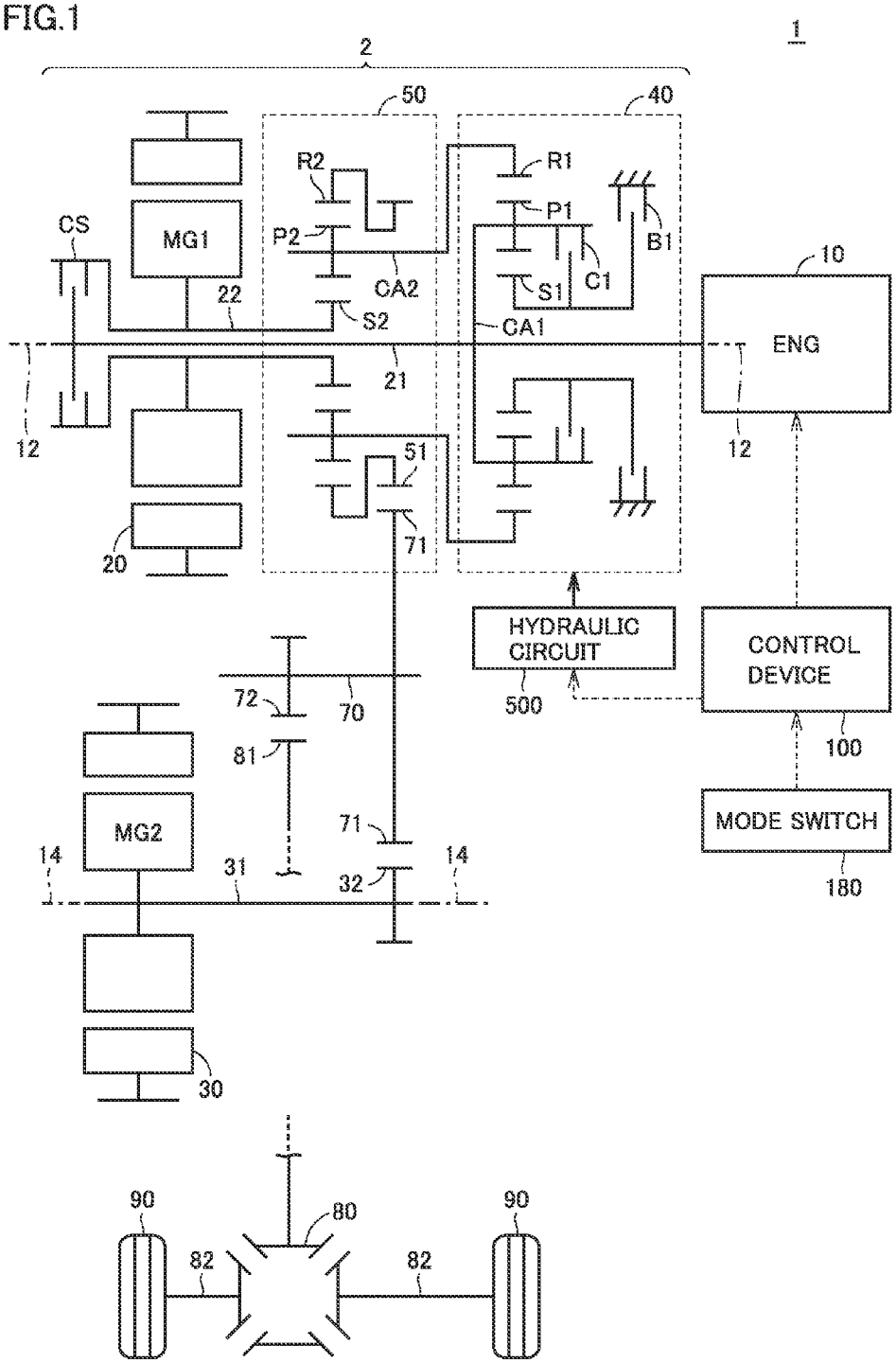
FIG. 1 is a diagram showing an overall configuration of a hybrid vehicle including a drive device according to an embodiment of this invention.

Embodiments of this invention will be hereinafter described referring to the drawings. In the following embodiments, the same or corresponding parts will be indicated by the same reference signs, and the description thereof will not be repeated.

[Overall Configuration of Hybrid Vehicle]

FIG. 1 is a diagram showing an overall configuration of a hybrid vehicle including a drive device according to the embodiment of this invention.

Referring to FIG. 1, hybrid vehicle 1 (hereinafter also referred to as vehicle 1) includes an engine 10, a drive device 2, driving wheels 90, and a control device 100. Drive device 2 includes a first motor generator (hereinafter referred to as "first MG") 20, a second motor generator (hereinafter referred to as "second MG") 30, a transmission unit 40, a differential unit 50, a clutch CS, an input shaft 21, an output shaft (a counter shaft) 70, a differential gear 80, and a hydraulic circuit 500.

Hybrid vehicle 1 is a hybrid vehicle of an FF (Front engine Front drive) system that runs with the motive power of at least any of engine 10, first MG 20, and second MG 30. Hybrid vehicle 1 may be a plug-in hybrid vehicle allowing a battery (not shown) mounted in the vehicle to be charged via an external power supply.

Engine 10 is, for example, an internal combustion engine such as a gasoline engine or a diesel engine.

Each of first MG 20 and second MG 30 is, for example, a permanent magnet type synchronous motor having a rotor in which a permanent magnet is embedded. Drive device 2 is a multi-shaft type drive device in which first MG 20 is disposed on a first axis 12 coaxial with a crankshaft (output shaft) of engine 10, and second MG 30 is disposed on a second axis 14 different from first axis 12. First axis 12 and second axis 14 are parallel to each other.

Transmission unit 40, differential unit 50, and clutch CS are further arranged on first axis 12. Transmission unit 40, differential unit 50, first MG 20, and clutch CS are arranged in the order mentioned from the side near engine 10.

First MG 20 is disposed such that the motive power from engine 10 can be input thereto. More specifically, input shaft 21 of drive device 2 is connected to the crankshaft of engine 10. Input shaft 21 extends along first axis 12 in a direction away from engine 10. Input shaft 21 is connected to clutch CS at a tip extended from engine 10. Rotation shaft 22 having a cylindrical shape of first MG 20 extends along first axis 12. Input shaft 21 passes through the inside of rotation shaft 22 before being connected to clutch CS. Input shaft 21 is connected to rotation shaft 22 of first MG 20 via clutch CS.

Clutch CS is disposed on a power transmission path from engine 10 to first MG 20. Clutch CS is a hydraulic friction engagement element that can couple input shaft 21 and rotation shaft 22 of first MG 20. When clutch CS is brought into an engaged state, input shaft 21 and rotation shaft 22 are coupled to each other, which permits transmission of motive power from engine 10 to first MG 20. When clutch CS is brought into a released state, input shaft 21 and rotation shaft 22 are decoupled from each other, which cuts off the transmission of the motive power from engine 10 to first MG 20 via clutch CS.

Transmission unit 40 shifts the motive power from engine 10 for output to differential unit 50. Transmission unit 40 has a single pinion type planetary gear mechanism including a sun gear S1, a pinion gear P1, a ring gear R1, and a carrier CA1, and also has a clutch C1 and a brake B1.

Sun gear S1 is disposed such that its center of rotation is first axis 12. Ring gear R1 is disposed coaxially with sun gear S1 and radially outward of sun gear S1. Pinion gear P1 is disposed between sun gear S1 and ring gear R1, and meshes with sun gear S1 and ring gear R1. Pinion gear P1 is rotatably supported by carrier CA1. Carrier CA1 is connected to input shaft 21 and rotates integrally with input shaft 21. Pinion gear P1 is disposed to be capable of rotating (revolving) around first axis 12, and capable of rotating (revolving) around the center shaft of pinion gear P1.

As will be shown in each of FIGS. 5 to 11 described later, the rotation speed of sun gear S1, the rotation speed of carrier CA1 (that is, the rotation speed of engine 10), and the rotation speed of ring gear R1 are related to one another such that they are connected in a straight line in the nomographic chart (that is, when any two of the rotation speeds are set, the remaining rotation speed is also set).

In this embodiment, carrier CA1 is provided as an input element to which the motive power from engine 10 is input, and ring gear R1 is provided as an output element from which the motive power input to carrier CA1 is output. Through the planetary gear mechanism including sun gear S1, pinion gear P1, ring gear R1, and carrier CA1, the motive power input to carrier CA1 is shifted and output from ring gear R1.

Clutch C1 is a hydraulic friction engagement element that can couple sun gear S1 and carrier CA1. When clutch C1 is brought into an engaged state, sun gear S1 and carrier CA1 are coupled to each other and rotate integrally. When clutch C1 is brought into a released state, the integral rotation of sun gear S1 and carrier CA1 is removed.

Brake B1 is a hydraulic friction engagement element that can regulate (lock) the rotation of sun gear S1. When brake B1 is brought into an engaged state, sun gear S1 is fixed to a case body of the drive device, which regulates the rotation of sun gear S1. When brake B1 is brought into a released (disengaged) state, sun gear S1 is detached from the case body of the drive device, which permits the rotation of sun gear S1.

A speed ratio of transmission unit 40 (a ratio of the rotation speed of carrier CA1 as the input element to the rotation speed of ring gear R1 as the output element; i.e., the rotation speed of carrier CA1/the rotation speed of ring gear R1) can be switched in accordance with the combination of engagement and release of clutch C1 and brake B1. When clutch C1 is engaged and brake B1 is released, a low speed position Lo with a speed ratio of 1.0 (direct drive state) is created. When clutch C1 is released and brake B1 is engaged, a high speed position Hi with a speed ratio of less than 1.0 (for example, 0.7, so-called overdrive state) is created. Note that when clutch C1 is engaged and brake B1 is engaged, the rotation of sun gear S1 and carrier CA1 is regulated, which also regulates the rotation of ring gear R1.

Transmission unit 40 is configured to be capable of switching between a non-neutral state where the motive power is transmitted and a neutral state where the motive power is not transmitted. In this embodiment, the direct drive state and the overdrive state described above correspond to the non-neutral state. On the other hand, when clutch C1 and brake B1 are both released, carrier CA1 is capable of idling around first axis 12. This achieves the neutral state where the motive power transmitted from engine 10 to carrier CA1 is not transmitted to ring gear R1 from carrier CA1.

Differential unit 50 has a single pinion type planetary gear mechanism including a sun gear S2, a pinion gear P2, a ring gear R2, and a carrier CA2, and also has a counter drive gear 51.

Sun gear S2 is disposed such that its center of rotation is first axis 12. Ring gear R2 is disposed coaxially with sun gear S2 and radially outward of sun gear S2. Pinion gear P2 is disposed between sun gear S2 and ring gear R2, and meshes with sun gear S2 and ring gear R2. Pinion gear P2 is rotatably supported by carrier CA2. Carrier CA2 is connected to ring gear R1 of transmission unit 40, and rotates integrally with ring gear R1. Pinion gear P2 is disposed to be capable of rotating (revolution) around first axis 12, and capable of rotating (rotation) around the center shaft of pinion gear P2.

Rotation shaft 22 of first MG 20 is connected to sun gear S2. Rotation shaft 22 of first MG 20 rotates integrally with sun gear S2. Counter drive gear 51 is connected to ring gear R2. Counter drive gear 51 is an output gear of differential unit 50, which rotates integrally with ring gear R2.

As will be shown in each of FIGS. 5 to 11 described later, the rotation speed of sun gear S2 (that is, the rotation speed of first MG 20), the rotation speed of carrier CA2, and the rotation speed of ring gear R2 are related to one another such that they are connected in a straight line in the nomographic chart (that is, when any two of the rotation speeds are set, a remaining rotation speed is also set). Thus, when the rotation speed of carrier CA2 is a prescribed value, rotation speed of ring gear R2 can be steplessly switched by adjusting the rotation speed of first MG 20.

Note that in the present embodiment, differential unit 50 is configured of a planetary gear mechanism. However, differential unit 50 is not limited thereto, and it may be of any component configured such that when any two of three rotation elements have their rotation speeds determined, the remaining one rotation element has its rotational speed determined, and for example, it may be configured of a differential gear.

Output shaft (counter shaft) 70 extends in parallel with first axis 12 and second axis 14. Output shaft (counter shaft) 70 is arranged in parallel with rotation shaft 22 of first MG 20 and a rotation shaft 31 of second MG 30. Output shaft (counter shaft) 70 is provided with a driven gear 71 and a drive gear 72. Driven gear 71 meshes with counter drive gear 51 of differential unit 50. That is, the motive power of engine 10 and first MG 20 is transmitted to output shaft (counter shaft) 70 via counter drive gear 51 of differential unit 50.

Note that transmission unit 40 and differential unit 50 are connected in series on a power transmission path from engine 10 to output shaft (counter shaft) 70. Thus, the motive power from engine 10 is transmitted to output shaft (counter shaft) 70 after being shifted through transmission unit 40 and differential unit 50.

Driven gear 71 meshes with a reduction gear 32 connected to rotation shaft 31 of second MG 30. That is, the motive power of second MG 30 is transmitted to output shaft (counter shaft) 70 via reduction gear 32.

Drive gear 72 meshes with a differential ring gear 81 of differential gear 80. Differential gear 80 is connected to right and left driving wheels 90 via right and left driving shafts 82, respectively. That is, the rotation of output shaft (counter shaft) 70 is transmitted to the right and left drive shafts 82 via differential gear 80.

The configuration as described above including clutch CS allows hybrid vehicle 1 to operate in the series/parallel mode and in the series mode. In this context, how the motive power is transmitted from the engine in each of the modes will be described with the schematic diagram in FIG. 2.

Figure 2:
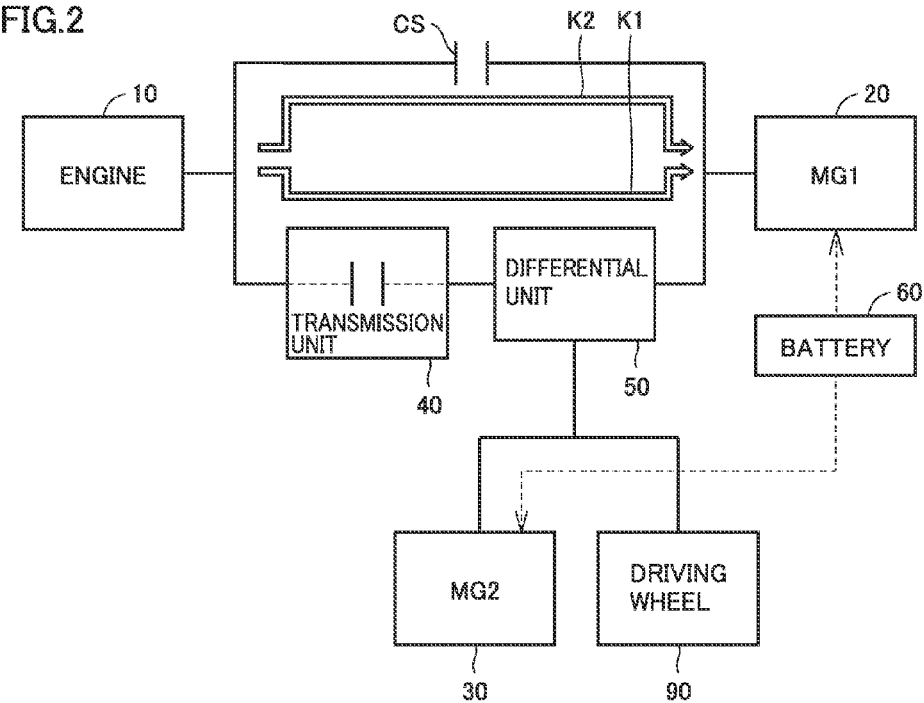
FIG. 2 is a block diagram showing a power transmission path between various components of the vehicle in FIG. 1 in a simplified form.

FIG. 2 is a block diagram showing a power transmission path between various components of the vehicle in FIG. 1 in a simplified form. Referring to FIG. 2, hybrid vehicle 1 includes engine 10, first MG 20, second MG 30, transmission unit 40, differential unit 50, battery 60, and clutch CS.

Second MG 30 is disposed to be capable of outputting the motive power to driving wheels 90. Transmission unit 40 has an input element to which the motive power from engine 10 is input, and an output element from which the motive power input to the input element is output. Transmission unit 40 is configured to be capable of switching between the non-neutral state where the motive power is transmitted between the input element and the output element and the neutral state where the motive power is not transmitted between the input element and the output element.

Battery 60 supplies electric power to first MG 20 and second MG 30 during power running, and stores electric power generated by first MG 20 and second MG 30 during regeneration.

Differential unit 50 has a first rotation element connected to first MG 20, a second rotation element connected to second MG 30 and driving wheels 90, and a third rotation element connected to the output element of transmission unit 40. Differential unit 50 is configured like a planetary gear mechanism, for example, such that the rotation speeds of any two of the first to third rotation elements are set, the rotation speed of a remaining one rotation element is also set.

Hybrid vehicle 1 is configured to be capable of transmitting the motive power from engine 10 to first MG 20 through at least any of two paths, K1, K2, for transmitting the motive power. Path K1 is a path for transmitting the motive power to first MG 20 from engine 10 by way of transmission unit 40 and differential unit 50. Path K2 is a path for transmitting the motive power to first MG 20 from engine 10 differently from path K1. Clutch CS is disposed along path K2, and is capable of switching between the engaged state where the motive power is transmitted from engine 10 to first MG 20 and the released state where the transmission of the motive power from engine 10 to first MG 20 is cut off.

In an HV running mode where the engine is operated, when transmission unit 40 is controlled to be in the non-neutral state with either clutch C1 or brake B1 being brought into an engaged state and the other into a released state, the motive power is transmitted to first MG 20 from engine 10 through path K1. When clutch CS is simultaneously brought into a released state to cut off path K2, the vehicle can be operated in the series/parallel mode.

On the other hand, in the HV running mode where the engine is operated, the vehicle can be operated in the series mode when the motive power is transmitted through path K2 with engine 10 and first MG 20 being directly connected to each other via clutch CS, and transmission unit 40 is controlled to be in the neutral state with clutch C1 and brake B1 both being brought into a released state to cut off path K1. At this time, the rotation element of differential unit 50 connected to transmission unit 40 is freely rotatable (free), such that the other two rotation elements are also rotatable without affecting each other. It is thus possible to independently perform the operation in which electric power is generated by rotating first MG 20 with the rotation of engine 10 and the operation in which the driving wheels are rotated by driving second MG 30 using the generated electric power or the electric power charged in battery 60.

Note that transmission unit 40 may not necessarily be capable of changing the speed ratio, and may alternatively be a simple clutch or the like as long as it is capable of cutting off the power transmission between engine 10 and differential unit 50 through path K1.

Figure 3:
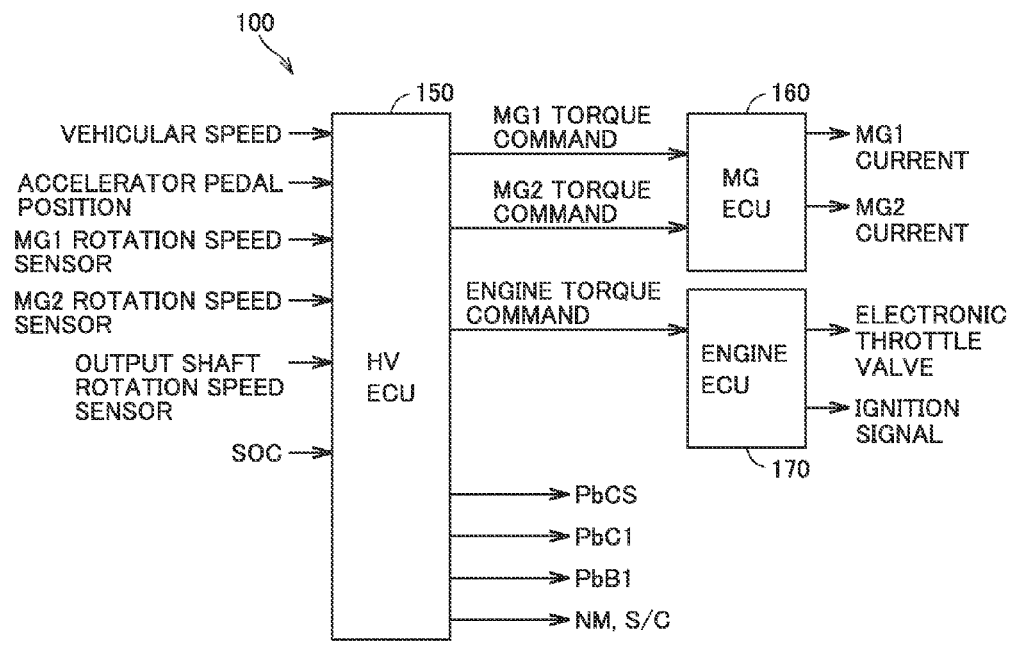
FIG. 3 is a block diagram showing the configuration of a control device 100 of the vehicle in FIG. 1.

FIG. 3 is a block diagram showing the configuration of control device 100 of the vehicle in FIG. 1. Referring to FIG. 3, control device 100 includes an HV ECU (Electric Control Unit) 150, an MG ECU 160, and an engine ECU 170. Each of HV ECU 150, MG ECU 160, and engine ECU 170 is an electronic control unit configured to include a computer.

Note that the number of ECUs is not limited to three; alternatively, the ECUs may be integrated as a single ECU as a whole, or may be divided into two, or four or more.

MG ECU 160 controls first MG 20 and second MG 30. MG ECU 160, for example, controls an output torque of first MG 20 by adjusting a value of a current supplied to first MG 20, and controls an output torque of second MG 30 by adjusting a value of a current supplied to second MG 30.

Engine ECU 170 controls engine 10. Engine ECU 170, for example, performs control of the position of an electronic throttle valve of engine 10, ignition control of the engine by outputting an ignition signal, and injection control of fuel to engine 10. Engine ECU 170 controls an output torque of engine 10 by the electronic throttle valve position control, the injection control, the ignition control, and the like.

HV ECU 150 integrally controls the entire vehicle. HV ECU 150 is connected with a vehicular speed sensor, an accelerator pedal position sensor, an MG1 rotation speed sensor, an MG2 rotation speed sensor, an output shaft rotation speed sensor, a battery sensor, and the like. From these sensors, HV ECU 150 obtains a vehicular speed, an accelerator pedal position, a rotation speed of first MG 20, a rotation speed of second MG 30, a rotation speed of the output shaft of the power transmission device, a battery state SOC, and the like.

HV ECU 150 calculates, based on the obtained information, a required driving force, required power, a required torque, and the like for the vehicle. HV ECU 150 determines, based on the calculated required values, the output torque of first MG 20 (hereinafter also denoted as the "MG1 torque"), the output torque of second MG 30 (hereinafter also denoted as the "MG2 torque"), and the output torque of engine 10 (hereinafter also denoted as the "engine torque"). HV ECU 150 outputs a command value of the MG1 torque and a command value of the MG2 torque to MG ECU 160. HV ECU 150 also outputs a command value of the engine torque to engine ECU 170.

HV ECU 150 controls clutches C1, CS and brake B1 based on a running mode and the like described later. HV ECU 150 outputs, to hydraulic circuit 500 in FIG. 1, a command value (PbC1, PbCS) of a hydraulic pressure supplied to clutches C1, CS and a command value (PbB1) of a hydraulic pressure supplied to brake B1. Furthermore HV ECU 150 outputs a control signal NM and a control signal S/C to hydraulic circuit 500 in FIG. 1.

Hydraulic circuit 500 of FIG. 1 controls the hydraulic pressure supplied to clutch C1 and brake B1 in response to command values PbC1 and PbB1, and also controls an electric-powered oil pump by control signal NM and controls permission/prohibition of simultaneous engagement of clutch C1, brake B1 and clutch CS by control signal S/C.

[Control Mode of Hybrid Vehicle]

Details of control modes of hybrid vehicle 1 will be described below with an operation engagement table and nomographic charts.

FIG. 4 is a diagram showing each running mode, as well as control states of clutch C1 and brake B1 of transmission unit 40 in each running mode.

Control device 100 causes hybrid vehicle 1 to run in a "motor running mode" (hereinafter referred to as the "EV running mode") or in a "hybrid running mode" (hereinafter referred to as the "HV running mode"). The EV running mode is a control mode where hybrid vehicle 1 is caused to run with the motive power of at least one of first MG 20 and second MG 30 while engine 10 is stopped. The HV running mode is a control mode where hybrid vehicle 1 is caused to run with the motive power of engine 10 and second MG 30. Note that in addition to these control modes, an engine running mode may be added to cause the vehicle to run by the driving force of engine 10 without using first MG 20 or second MG 30. Each of the EV running mode and the HV running mode is subdivided into further control modes.

In FIG. 4, "C1", "B1", "CS", "MG1", and "MG2" indicate clutch C1, brake B1, clutch CS, first MG 20, and second MG 30, respectively. A round mark in the column of each of C1, B1 and CS indicates "engaged", a cross mark indicates "released", and a triangular mark indicates that either clutch C1 or brake B1 is engaged during engine braking. Moreover, "G" in the column of each of MG1 and MG2 indicates that the motor generator is operated mainly as a generator, and "M" indicates that the motor generator is operated mainly as a motor.

In the EV running mode, control device 100 selectively switches the control mode between a "single motor running mode" where hybrid vehicle 1 is caused to run with the motive power of second MG 30 alone and a "double motor running mode" where hybrid vehicle 1 is caused to run with the motive power of both first MG 20 and second MG 30, in accordance with the user's required torque and the like.

When the load on drive device 2 is low, the single motor running mode is used, and when the load is high, the control mode is shifted to the double motor running mode.

As shown in field E1 in FIG. 4, when hybrid vehicle 1 is driven (forward or backward) in the EV single motor running mode, control device 100 controls transmission unit 40 to be in the neutral state (where the motive power is not transmitted) by releasing clutch C1 and releasing brake B1. Here, control device 100 causes first MG 20 to operate mainly as a fixing means for fixing sun gear S2 to zero, and causes second MG 30 to operate mainly as a motor (see FIG. 5 described later). In order to cause first MG 20 to operate as the fixing means, control device 100 may control the current through first MG 20 by providing feedback of rotation speed such that the rotation speed of first MG 20 becomes zero. Alternatively, when the rotation speed of first MG 20 can be maintained at zero even at zero torque, cogging torque may be used without application of current. Note that when transmission unit 40 is controlled to be in the neutral state, engine 10 is not caused to rotate during regenerative braking. This reduces loss resulting from such rotation, and allows a large amount of regenerative electric power to be recovered.

As shown in a field E2 of FIG. 4, when hybrid vehicle 1 is braked in the EV single motor running mode and engine brake is also required, control device 100 engages either clutch C1 or brake B1. For example, when regenerative brake alone cannot provide sufficient braking force, engine brake is used together with regenerative brake. Furthermore, for example, when battery 60 has an SOC close to the electrically fully charged state, regenerated electric power cannot be charged thereto, and accordingly, applying an engine brake state may be considered.

By engaging either clutch C1 or brake B1, a so called engine brake state is attained where the rotation of driving wheels 90 is transmitted to engine 10 to rotate engine 10. At this time, control device 100 causes first MG 20 to operate mainly as a motor, and causes second MG 30 to operate mainly as a generator.

On the other hand, as shown in field E3 in FIG. 4, when hybrid vehicle 1 is driven (forward or backward) in the EV double motor running mode, control device 100 regulates (locks) the rotation of ring gear R1 of transmission unit 40 by engaging clutch C1 and engaging brake B1. This also regulates (locks) the rotation of carrier CA2 of differential unit 50 coupled to ring gear R1 of transmission unit 40, which causes carrier CA2 of differential unit 50 to be held stationary (engine rotation speed Ne=0). Control device 100 then causes first MG 20 and second MG 30 to operate mainly as motors (see FIG. 6 described later).

Furthermore, fields E4 and E5 in the EV running mode will be described. Although these modes also correspond to the double motor running mode as with field E3, they differ in that the vehicle can be operated at a point where engine rotation speed Ne is not zero (denoted as "Ne FREE" in FIG. 4).

The HV running mode can be divided into three types, i.e., a series/parallel mode, a series mode, and a parallel mode. In the series/parallel mode and the series mode, control device 100 causes first MG 20 to operate as a generator and causes MG 30 to operate as a motor. Furthermore, in the parallel mode, control device 100 causes only second MG 30 to operate as a motor (single motor) or causes both first MG 20 and second MG 30 to operate as motors (double motors).

In the HV running mode, control device 100 sets the control mode to any of the series/parallel mode, the series mode and the parallel mode.

In the series/parallel mode, part of the motive power of engine 10 is used to drive driving wheels 90, and the remaining motive power is used as the motive power for first MG 20 to generate electric power. Second MG 30 causes driving wheels 90 to rotate using the electric power generated by first MG 20. In the series/parallel mode, control device 100 switches the speed ratio of transmission unit 40 in accordance with the vehicular speed.

When hybrid vehicle 1 is driven forward in a middle-low speed range, as shown in field H2 in FIG. 4, control device 100 creates a low speed position Lo by engaging clutch C1 and releasing brake B1 (see FIG. 10 described later). On the other hand, when hybrid vehicle 1 is driven forward in a high speed range, as shown in field H1 in FIG. 4, control device 100 creates a high speed position Hi by releasing clutch C1 and engaging brake B1 (see FIG. 11 described later). When both the high speed position and the low speed position are created, transmission unit 40 and differential unit 50 as a whole operate as a continuously variable transmission.

When hybrid vehicle 1 is driven backward, as shown in field H3 in FIG. 4, control device 100 engages clutch C1 and releases brake B1. Control device 100 then causes second MG 30 to rotate backward alone when the SOC of the battery is sufficient. On the other hand, when the SOC of the battery is insufficient, control device 100 causes engine 10 to operate, so as to cause first MG 20 to generate electric power and second MG 30 to rotate backward.

In the series mode, all the motive power of engine 10 is used as the motive power for first MG 20 to generate electric power. Second MG 30 drives driving wheels 90 using the electric power generated by first MG 20. In the series mode, when hybrid vehicle 1 is driven forward or backward, as shown in fields H4 and H5 in FIG. 4, control device 100 releases both clutch C1 and brake B1, and engages clutch CS (see FIG. 7 described later).

Furthermore, fields H6 to H9 of the HV running mode indicate control states in the parallel mode. Although these modes are also HV running modes, first MG 20 will never operate as a generator. The HV (parallel) running mode in the double motor running mode is significantly different from the series/parallel mode and the series mode in that first MG 20 performs a power running operation as a motor and outputs a torque to rotate the driving wheels. In the parallel mode, one of clutch C1 and brake B1 is engaged, the other is released, and clutch CS is engaged. These modes will more specifically be described later with reference to the nomographic charts of FIG. 8 and FIG. 9.

Furthermore, vehicle 1 can also run in the engine running mode allowing the vehicle to run without using first MG 20 or second MG 30. When the running state of the vehicle matches a rotation speed and a torque that allow good efficiency of the engine, it is more efficient to use the engine's motive power directly to rotate the driving wheels, rather than using it to generate electric power or the like.

The state of each rotation element will be hereinafter described for representative ones of the operation modes shown in FIG. 4, using nomographic charts.

Figure 5:
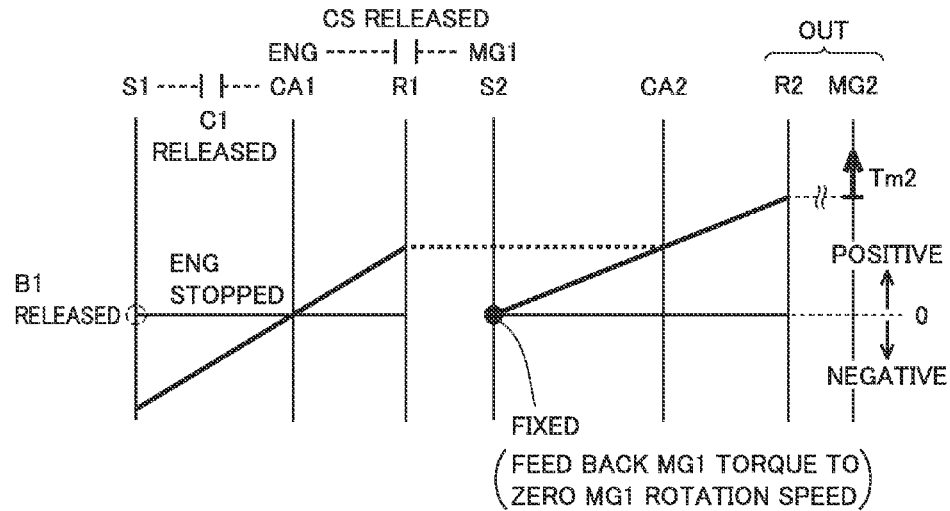
FIG. 5 is a nomographic chart in an EV single motor running mode.
Figure 6:
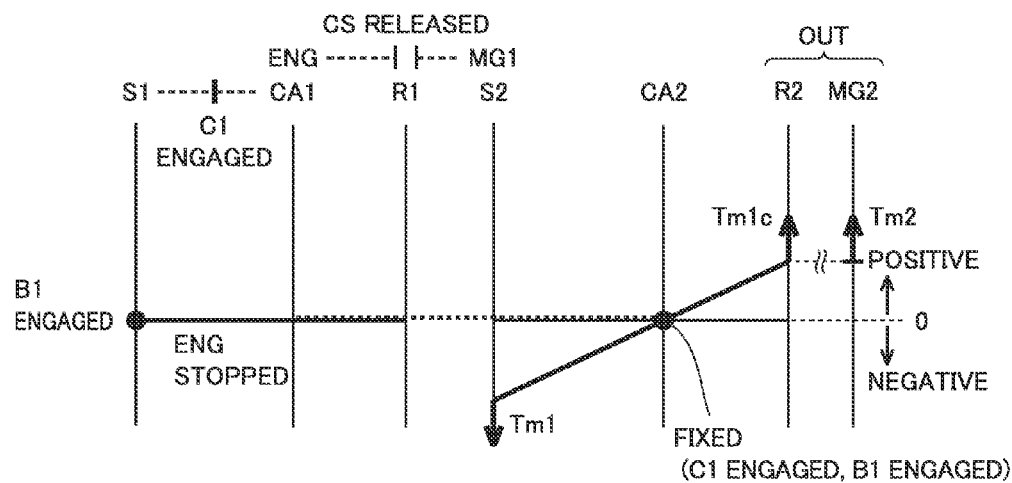
FIG. 6 is a nomographic chart in an EV double motor running mode.
Figure 7:
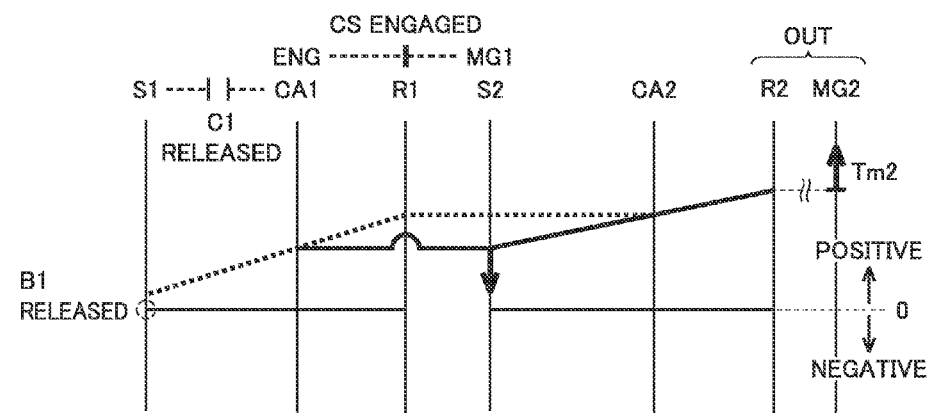
FIG. 7 is a nomographic chart in an HV running (series) mode.
Figure 8:
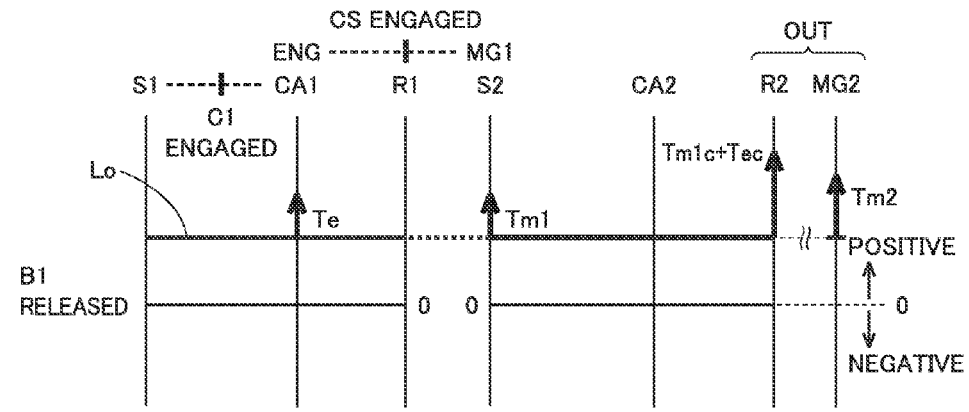
FIG. 8 is a nomographic chart in an HV running (parallel Lo) mode.
Figure 9:
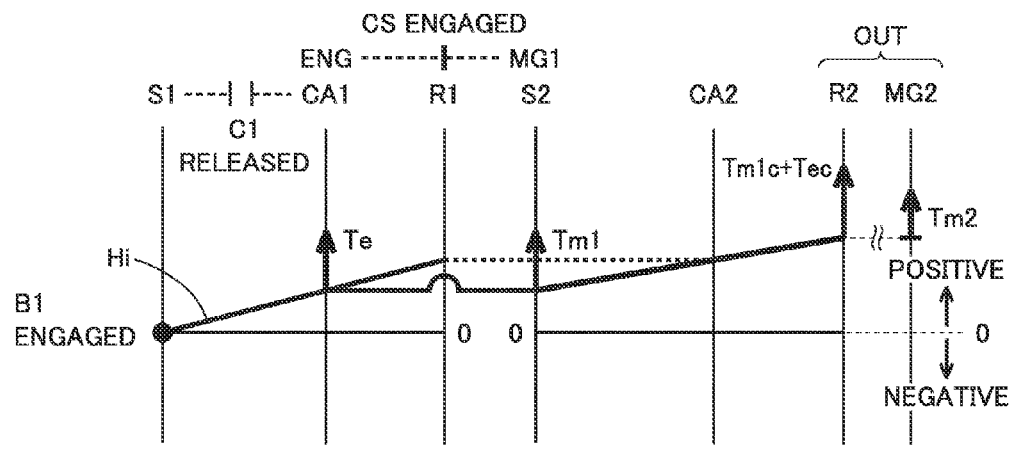
FIG. 9 is a nomographic chart in an HV running (parallel Hi) mode.

FIG. 5 is a nomographic chart in the EV single motor running mode. FIG. 6 is a nomographic chart in the EV double motor running mode. FIG. 7 is a nomographic chart in the HV running (series) mode. FIG. 8 is a nomographic chart in the HV running (parallel Lo) mode. FIG. 9 is a nomographic chart in the HV running (parallel Hi) mode. FIG. 10 is a nomographic chart in the HV running (series/parallel Lo) mode. FIG. 11 is a nomographic chart in the HV running (series/parallel Hi) mode.

In each of FIGS. 5 to 11, "S1", "CA1", and "R1" indicate sun gear S1, carrier CA1, and ring gear R1, respectively, of transmission unit 40, and "S2", "CA2", and "R2" indicate sun gear S2, carrier CA2, and ring gear R2, respectively, of differential unit 50.

A control state in the EV single motor running mode (FIG. 4: E1) will be described with reference to FIG. 5. In the EV single motor running mode, control device 100 releases clutch C1 and brake B1 of transmission unit 40 and clutch CS, and causes engine 10 to stop and causes second MG 30 to operate mainly as a motor. In the EV single motor running mode, therefore, hybrid vehicle 1 runs with the torque of second MG 30 (hereinafter referred to as "second MG torque Tm2").

At the time, control device 100 performs feedback control of the torque of first MG 20 (hereinafter referred to as the "first MG torque Tm1") such that the rotation speed of sun gear S2 becomes zero. Thus, sun gear S2 does not rotate. However, because clutch C1 and brake B1 of transmission unit 40 are released, the rotation of carrier CA2 of differential unit 50 is not regulated. Thus, ring gear R2 and carrier CA2 of differential unit 50, as well as ring gear R1 of transmission unit 40 are caused to move in conjunction with the rotation of second MG 30, and rotate (idle) in the same direction as the direction of rotation of second MG 30.

On the other hand, carrier CA1 of transmission unit 40 is held stationary because engine 10 is stopped. Sun gear S1 of transmission unit 40 is caused to move in conjunction with the rotation of ring gear R1, and rotate (idle) in the opposite direction to the direction of rotation of ring gear R1.

Note that, in order to reduce speed in the EV single motor running mode, it is also possible to apply engine braking in addition to regenerative braking using second MG 30. In that case (see FIG. 4: E2), one of clutch C1 and brake B1 is engaged, so that when carrier CA2 is driven from the driving wheel 90's side, engine 10 is also rotated, and engine braking is thus applied.

Next, referring to FIG. 6, a control state in the EV double motor running mode (FIG. 4: E3) will be described. In the EV double motor running mode, control device 100 engages clutch C1 and brake B1, releases clutch CS, and causes engine 10 to stop. Thus, the rotation speed of each of sun gear S1, carrier CA1, and ring gear R1 of transmission unit 40 is regulated to be zero.

Because the rotation of ring gear R1 of transmission unit 40 is regulated, the rotation of carrier CA2 of differential unit 50 is also regulated (locked). In this state, control device 100 causes first MG 20 and second MG 30 to operate mainly as motors. Specifically, second MG 30 is positively rotated using second MG torque Tm2 as a positive torque, and first MG 20 is negatively rotated using first MG torque Tm1 as a negative torque.

With clutch C1 being engaged and the rotation of carrier CA2 being regulated, first MG torque Tm1 is transmitted to ring gear R2 with carrier CA2 as a support. First MG torque Tm1 that is transmitted to ring gear R2 (hereinafter referred to as "first MG transmitted torque Tm1$c$") acts in the positive direction, and is transmitted to counter shaft 70. In the EV double motor running mode, therefore, hybrid vehicle 1 runs with first MG transmitted torque Tm1$c$ and second MG torque Tm2. Control device 100 adjusts a sharing ratio of first MG torque Tm1 to second MG torque Tm2 such that a total of first MG transmitted torque Tm1$c$ and second MG torque Tm2 meets the user's required torque.

Referring to FIG. 7, a control state in the HV running (series) mode (FIG. 4: H4) will be described. In the HV running (series) mode, control device 100 releases clutch C1 and brake B1, and engages clutch CS. Thus, with clutch CS being engaged, sun gear S2 of differential unit 50 rotates at the same rotation speed as that of carrier CA1 of transmission unit 40, and the rotation of engine 10 is transmitted at the same rotation speed to first MG 20 from clutch CS. This allows electric power to be generated by first MG 20 with engine 10 as a motive power source.

On the other hand, with both clutch C1 and brake B1 being released, the rotation of sun gear S1 and ring gear R1 of transmission unit 40 and the rotation of carrier CA2 of differential unit 50 are not regulated. That is, because transmission unit 40 is in the neutral state, and the rotation of carrier CA2 of differential unit 50 is not regulated, the motive power of first MG 20 and that of engine 10 are not transmitted to counter shaft 70. Thus, second MG torque Tm2 of second MG 30 is transmitted to counter shaft 70. In the HV running (series) mode, therefore, with electric power being generated by first MG 20 using engine 10 as a motive power source, hybrid vehicle 1 runs with second MG torque Tm2 using all or part of the generated electric power.

Because the series mode is now implementable, when the vehicular speed is low, or when the vehicle is in a state with low background noise, the operating point of engine 10 can be selected without concern for the generation of rattling noise by the gear mechanism due to engine torque variations, for which care was required in the series/parallel mode. This increases vehicle states where quietness and improved fuel efficiency of the vehicle can both be achieved.

Referring to FIG. 8, a control state in the HV running (parallel Lo) mode (FIG. 4: H8 and H9) will be described.

When low speed position Lo is created in the HV running (parallel) mode, control device 100 engages clutch C1 and clutch CS, and releases brake B1. Thus, the rotation elements of transmission unit 40 (sun gear S1, carrier CA1, and ring gear R1) rotate integrally. Thus, ring gear R1 of transmission unit 40 also rotates at the same rotation speed as carrier CA1. Furthermore, as clutch CS is engaged, sun gear S2 of differential unit 50 rotates at the same rotation speed as carrier CA1 of transmission unit 40, and the rotation of engine 10 is transmitted from clutch CS to first MG 20 at the same rotation speed. Thus, the rotation elements of transmission unit 40 and the rotation elements of differential unit 50 (sun gear S2, carrier CA2, ring gear R2) will all rotate at the same rotation speed. In other words, the rotation speed of engine 10 and the rotation speed of ring gear R2 have a rotation speed difference (or a speed ratio) fixed to a first speed ratio.

Referring to FIG. 9, a control state in the HV running (parallel Hi) mode (FIG. 4: H6 and H7) will be described.

When high speed position Hi is created in the HV running (parallel) mode, control device 100 engages brake B1 and clutch CS, and releases clutch C1. With brake B1 being engaged, the rotation of sun gear S1 is regulated. Thus, the rotation of engine 10 that has been input to carrier CA1 of transmission unit 40 is increased in speed, and then transmitted to carrier CA2 of differential unit 50 from ring gear R1 of transmission unit 40. On the other hand, as clutch CS is engaged, sun gear S2 of differential unit 50 rotates at the same rotation speed as that of carrier CA1 of transmission unit 40, and the rotation of engine 10 is transmitted at the same rotation speed to first MG 20 from clutch CS. Thus, the rotation speed of carrier CA2 and the rotation speed of sun gear S2 are regulated by engine speed, and accordingly, the rotation speed of engine 10 and the rotation speed of ring gear R2 have a rotation speed difference (or a speed ratio) fixed to a second speed ratio. Note that the second speed ratio has a value faster (or smaller) than the first speed ratio.

Note that in the double motor running mode of HV running (parallel: stepped) (see H7 and H9 in FIG. 4), all of a torque Te of engine 10 (hereinafter referred to as engine torque Te), MG1 torque Tm1, and MG2 torque Tm2 can be used as the rotation torque in the forward direction for the driving wheels, which is particularly effective when a great torque is required for the driving wheels. Furthermore, the control states in the single motor running mode of HV running (parallel: stepped) (see H6 and H8 in FIG. 4) correspond to the case where Tm1=0 in FIGS. 8 and 9. Moreover, in the HV running mode (parallel: stepped), the vehicle can also run using the engine torque alone, with Tm1=0 and Tm2=0.

Figure 10:
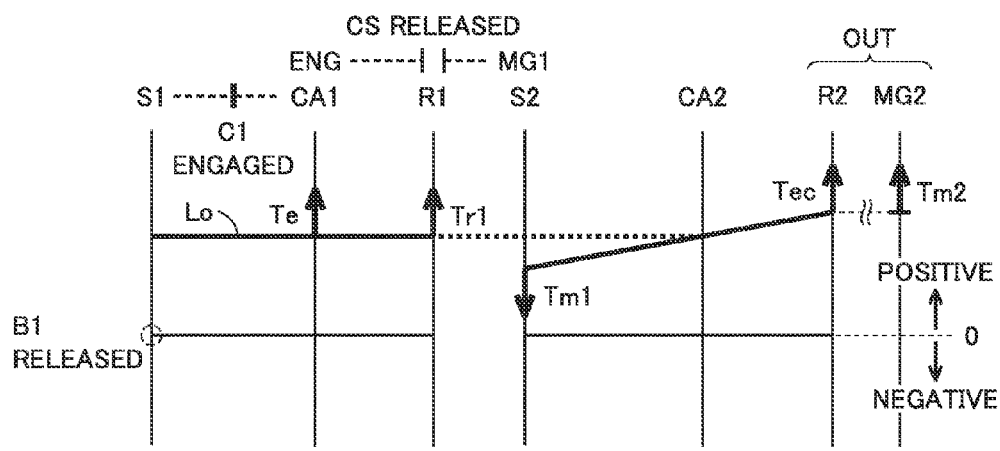
FIG. 10 is a nomographic chart in an HV running (series/parallel Lo) mode.

Referring to FIG. 10, a control state in the HV running (series/parallel Lo) mode (FIG. 4: H2) will be described.

When in the HV running (series/parallel) mode, and when low speed position Lo is created, control device 100 engages clutch C1, and releases brake B1 and clutch CS. Thus, the rotation elements (sun gear S1, carrier CAL and ring gear R1) rotate integrally. This causes ring gear R1 of transmission unit 40 to also rotate at the same speed as that of carrier CAL and the rotation of engine 10 is transmitted at the same rotation speed to carrier CA2 of differential unit 50 from ring gear R1. That is, engine torque Te that has been input to carrier CA1 of transmission unit 40 is transmitted to carrier CA2 of differential unit 50 from ring gear R1 of transmission unit 40. Note that the torque that is output from ring gear R1 when low speed position Lo is created (hereinafter referred to as "transmission unit output torque Tr1") is the same in magnitude as engine torque Te (Te=Tr1).

The rotation speed of engine 10 transmitted to carrier CA2 of differential unit 50 is continuously shifted by the rotation speed of sun gear S2 (the rotation speed of first MG 20), and then transmitted to ring gear R2 of differential unit 50. At the time, control device 100 basically causes first MG 20 to operate as a generator, and causes first MG torque Tm1 to act in the negative direction. Thus, first MG torque Tm1 has a reaction force for transmitting engine torque Te that has been input to carrier CA2 to ring gear R2.

Engine torque Te transmitted to ring gear R2 (hereinafter referred to as "engine transmitted torque Tec") is transmitted to counter shaft 70 from counter drive gear 51, and acts as a driving force for hybrid vehicle 1.

Moreover, in the HV running (series/parallel Lo) mode, control device 100 causes second MG 30 to operate mainly as a motor. Second MG torque Tm2 is transmitted to counter shaft 70 from reduction gear 32, and acts as a driving force for hybrid vehicle 1. That is, in the HV running (series/parallel Lo) mode, hybrid vehicle 1 runs with engine transmitted torque Tec and second MG torque Tm2.

Referring to FIG. 11, a control state in the HV running (series/parallel Hi) mode (FIG. 4: H1) will be described.

When in the HV running (series/parallel) mode, and when high speed position Hi is created, control device 100 engages brake B1, and releases clutch C1 and clutch CS. With brake B1 being engaged, the rotation of sun gear S1 is regulated. Thus, the rotation of engine 10 that has been input to carrier CA1 of transmission unit 40 is increased in speed, and then transmitted to carrier CA2 of differential unit 50 from ring gear R1 of transmission unit 40. Hence, when high speed position Hi is created, transmission unit output torque Tr1 is smaller than engine torque Te (Te>Tr1).

[Condition Under which Each Operation Mode is Used]

FIG. 12 is a mode determination map for determining a running mode when hybrid vehicle 1 runs mainly with fuel as an energy source. This mode determination map is used when the hybrid vehicle runs in a normal state, or when a plug-in hybrid vehicle runs in the CS mode where the power storage state of the battery is sustained. FIG. 12 shows a map of which borderlines are indicated by the broken lines and a map of which borderlines are indicated by the solid lines, in a layered manner. The map of which borderlines are indicated by the broken lines is used in a normal state when input/output power to/from battery 60 is not restricted. On the other hand, the map of which borderlines are indicated by the solid lines is used when the input/output power to/from battery 60 is restricted in accordance with various conditions such as the SOC and temperature.

A range where the vehicular load is positive in the map of which borderlines are indicated by the broken lines will be described first. The EV single motor running mode is used within a range where the vehicular load is small at a vehicular speed near zero. Here, single motor running is used rather than double motor running, in order to allow the engine to be immediately started when the accelerator pedal is suddenly depressed. Then, when the vehicular speed becomes higher, or the vehicular load increases, the series/parallel (Lo) mode is used. When the vehicular load further increases, and the torque becomes insufficient with the series/parallel (Lo) mode, all the engine torque is output to the driving wheels in the parallel (Lo) mode, and motor assist that also uses the MG1 torque or MG2 torque is executed. Note that this mode may be used at the time of a power-on downshift.

A range where the vehicular load is negative in the map of which borderlines are indicated by the broken lines will be described next. The EV single motor running mode is used within a range where the vehicular load is small at a vehicular speed near zero. The series mode is used when the vehicular speed increases. Here, the range of the EV single motor running mode when the vehicular speed is negative is wider than that when the vehicular speed is positive. This is because engine 10 is started in the series mode, and thus, there is no need to allow for a reaction torque to reduce shock at the start of the engine.

A range where the vehicular load is positive in the map of which borderlines are indicated by the solid lines will be described next. When the vehicular load is positive, and the vehicular speed is low, the series mode is executed. The series mode is an operation mode effective for preventing noise caused by rattling between second MG 30 and the differential gear (so-called rattling noise).

As the vehicular speed increases, the operation mode transitions, from the series mode, to the parallel (Hi) mode and the series/parallel (Hi) mode, in this order. The parallel (Hi) mode, which has a fixed gear ratio, is used in a relatively narrow band-like range because engine 10 tends to be operated outside an operating point having minimum fuel consumption.

The operation mode then transitions from the series mode to the series/parallel (Lo) mode as the vehicular load increases. The series/parallel (Lo) mode is an operation mode effective in a range where the driving force is given priority.

A range where the vehicular load is negative in the map of which borderlines are indicated by the solid lines will be described next. When the vehicular load is negative, the series mode is used regardless of the vehicular speed. In the series mode, the engine rotation speed can be controlled as desired at the same vehicular speed. Therefore, an engine braking torque in accordance with the driver's request can be generated. Because first MG 20 is rotated against the engine braking torque, first MG 20 performs a power running operation. This allows first MG 20 to consume regenerative electric power generated by second MG 30 during regenerative braking, which allows regenerative braking to be performed by second MG 30 even if battery 60 cannot receive the regenerative electric power. Moreover, because the rotation speed of first MG 20 and the engine rotation speed are the same, compared to the other modes, the series mode is unlikely to subject to a restriction on the engine rotation speed due to a rotation speed upper limit of first MG 20. Thus, the absolute value of the engine braking torque can also be increased.

Figure 13:
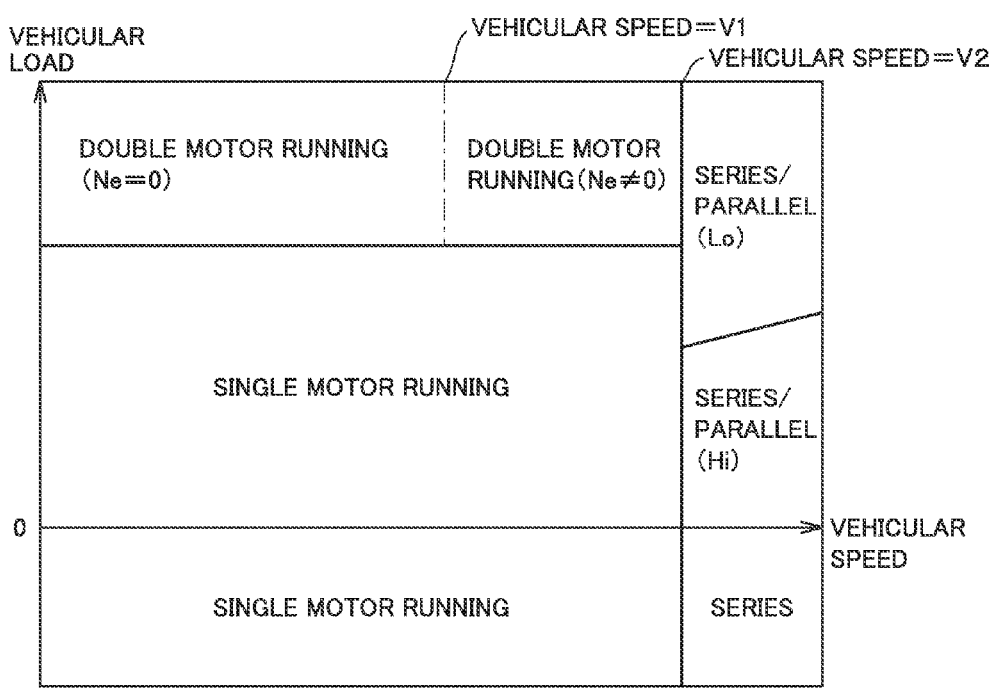
FIG. 13 is a mode determination map for determining a running mode when the hybrid vehicle runs mainly with electric power charged in a battery as an energy source.

FIG. 13 is a mode determination map for determining a running mode when hybrid vehicle 1 runs mainly with electric power charged in battery 60 as an energy source. This mode determination map is used when the hybrid vehicle performs EV running, or when a plug-in hybrid vehicle runs in the CD mode where the power storage state of the battery is consumed.

Referring to FIG. 13, the EV running mode of single motor running is used in positive and negative low-load ranges. In the CD mode, a relatively wide range can be allotted to the EV running mode of single motor running, because starting of engine 10 may not be basically contemplated and thus, a reaction force compensation torque accompanied by starting of engine 10 is not required.

In a high-load range, the double motor running mode is selected because the torque is insufficient with the single motor running. That is, the EV running mode of single motor running is selected in the range where the vehicular speed is lower than a prescribed value and the load is small, and the EV mode of double motor running is selected when the load is greater than a prescribed value.

When the vehicular speed exceeds prescribed value V1 in the double motor running mode, there is an upper limit for the rotation speed of first MG 20 or the pinion gear. Therefore, the vehicle state changes from the double motor running where engine rotation speed Ne is zero to the double motor running where Ne is not zero.

When the vehicular speed exceeds V2, energy efficiency during running with the electric power of the battery tends to decrease, and thus, an HV running mode of any of the series/parallel (Lo) mode, the series/parallel (Hi) mode, and the series mode is selected. In FIG. 13, in a range where the vehicular speed is higher than V2, the series mode is selected when the vehicular load is negative, and when the vehicular load is positive, the series/parallel (Hi) mode is selected at lower load, and the series/parallel (Lo) mode is selected at higher load.

In vehicle 1 thus configured, when running mode switching is done involving controlling clutch CS for engagement/disengagement and controlling transmission unit 40 to change speed, the number of targets to be simultaneously controlled increases, and such running mode switching control may be more complicated than other running mode switching controls.

FIG. 14 shows: how targets to be controlled corresponding to combinations of running modes before switching and running modes after switching (i.e., clutch C1, brake B1, clutch CS, and output torque Tg of first MG 20) change; the number of targets to be controlled to be changed; and whether synchronization before switching a running mode can be done. As indicated in FIG. 14, the running modes before switching include (A) the series mode, (B) the series/parallel (Lo) mode, (C) the series/parallel (Hi) mode, (D) the parallel (Lo) mode, and (E) the parallel (Hi) mode. Similarly, the running modes after switching also include (a) the series mode, (b) the series/parallel (Lo) mode, (c) the series/parallel (Hi) mode, (d) the parallel (Lo) mode, and (e) the parallel (Hi) mode.

In FIG. 14, "C1", "B1", and "CS" indicate whether there is a change in the engaged/released states of clutch C1, brake B1, and clutch CS, respectively. More specifically, a circle indicated in a field indicates an engaged state and a cross indicates a released state. In other words, in FIG. 14, a circle followed by an arrow followed by a cross indicates that the engaged state is shifted to the released state. In FIG. 14, a cross followed by an arrow followed by a circle indicates that the released state is shifted to the engaged state. In FIG. 14, a circle indicates that the engaged state is maintained. In FIG. 14, a cross indicates that the released state is maintained.

In FIG. 14, "Tg" indicates whether output torque Tg of first MG 20 varies. Specifically, a circle indicates that there is a torque output (or the torque is not zero), and a cross indicates that the torque output is zero. In other words, in FIG. 14, a circle followed by an arrow followed by a cross indicates that a state in which there is a torque output is shifted to a state in which the torque output is zeroed. In FIG. 14, a cross followed by an arrow followed by a circle indicates that a state in which a torque output is zeroed is shifted to a state in which there is a torque output. In FIG. 14, a circle followed by an arrow followed by a circle indicates that both states have torques output although the torques output have variation therebetween in magnitude. In FIG. 14, a cross indicates that a state is held in which a torque output is zeroed.

In FIG. 14, "sum" indicates the number of targets to be controlled to be changed. Note that in FIG. 14 a circle followed by an arrow followed by a circle, indicating that torques output have variation therebetween in magnitude, is also included in the number of targets to be controlled to be changed.

In FIG. 14, "synchronization" indicates whether the rotation speed of an engagement element of transmission unit 40 and differential unit 50 (i.e., at least one of clutch C1 and clutch CS) can be synchronized before a running mode is switched. In FIG. 14, "synchronizable" indicates that synchronization before switching running modes can be done and "not synchronizable" indicates that synchronization before switching running modes cannot be done.

For example, when the running mode before switching is the series/parallel (Lo) mode, and the running mode after switching is the parallel (Hi) mode, which corresponds in FIG. 14 to the combination of (B) and (e), then in FIG. 14 "C1" is a circle followed by an arrow followed by a cross, and clutch C1 thus shifts from the engaged state to the released state. In FIG. 14 "B1" is a cross followed by an arrow followed by a circle, and brake B1 thus shifts from the released state to the engaged state. In FIG. 14 "CS" is a cross followed by an arrow followed by a circle, and clutch CS thus shifts from the released state to the engaged state. In FIG. 14 "Tg" is a circle followed by an arrow followed by a cross, and thus shifts from a state in which there is a torque output to a state in which the torque output is zeroed.

The targets to be controlled to be changed are "C1", "B1", "CS", and "Tg" for a total of four targets, and accordingly in FIG. 14 the "sum" field indicates "4". Furthermore, the speed ratio in the parallel (Hi) mode, which indicates in the present embodiment the rotation speed ratio of the rotation speed of carrier CA1 of transmission unit 40 and the rotation speed of ring gear R2 of differential unit 50 for the sake of illustration, is not included in a range of speed ratios applied in the series/parallel (Lo) mode to allow a speed ratio to be changed thereto, and accordingly in FIG. 14 the "synchronization" field indicates "not synchronizable."

Note that other combinations of running modes before switching and running modes after switching shown in FIG. 14 provide changes as indicated in FIG. 14, as set forth above, and the changes will not be described repeatedly in detail.

Of the FIG. 14 combinations of running modes before switching and running modes after switching, as indicated in FIG. 14 by a broken-line frame, running mode switching in combinations of the series/parallel (Lo) mode and the parallel (Hi) mode (i.e., the (B)-(e) combination and the (E)-(b) combination indicated in FIG. 14) and running mode switching in combinations of the series/parallel (Hi) mode and the parallel (Lo) mode (i.e., the (C)-(d) combination and the (D)-(c) combination indicated in FIG. 14) have more (i.e., four) targets to be controlled to be changed than running mode switching in the other combinations, and are also not "synchronizable." This is because, in addition to switching a running mode between the series/parallel mode and the parallel mode, it is necessary to switch a shift position in transmission unit 40 between a low speed position (clutch C1 engaged, and brake B1 released) and a high speed position (brake B1 engaged, and clutch C1 released).

Thus, synchronization before switching running modes cannot be done and in addition thereto there is a large number of targets to be controlled to be simultaneously changed in switching the running modes, which may result in complicated running mode switching control.

Accordingly, the present embodiment is characterized in that when control device 100 switches a running mode between the series/parallel mode and the parallel mode and also switches a shift position to another, control device 100 switches the running mode and the shift position via the series mode.

In this manner, the number of targets to be controlled to be changed by switching to/from the series mode is smaller than the number of targets to be controlled to be changed by switching a running mode between the series/parallel mode and the parallel mode and also switching a shift position to another, and switching a running mode via the series mode can suppress complication of running mode switching control.

Furthermore, in the present embodiment, when control device 100 switches a state in which one of the low speed position and the high speed position is created in the series/parallel mode to a state in which the other shift position is created in the parallel mode via the series mode, then, before switching the series/parallel mode to the series mode, control device 100 performs a first synchronous control to synchronize a speed ratio with a speed ratio applied when one shift position is created in the parallel mode, and after having switched the series/parallel mode to the series mode, control device 100 performs a second synchronous control to synchronize the speed ratio with a speed ratio applied when the other shift position is created in the parallel mode.

Note that when a direction in which a speed ratio changes by the first synchronous control is opposite to a direction in which the speed ratio changes by the second synchronous control, control device 100 switches the series/parallel running mode to the series running mode without performing the first synchronous control.

Furthermore, when control device 100 switches a state in which one of the low speed position and the high speed position is created in the parallel mode to a state in which the other shift position is created in the series/parallel mode via the series mode, then, while in the series mode, control device 100 performs a first synchronous control to synchronize a speed ratio with a speed ratio applied when the other shift position is created in the parallel mode, and after having switched the series mode to the series/parallel mode, control device 100 performs a second synchronous control to change the speed ratio a target value.

Note that when a direction in which a speed ratio changes by the first synchronous control is opposite to a direction in which the speed ratio changes by the second synchronous control, control device 100 switches the series mode to the series/parallel mode without performing the first control.

Figure 15:
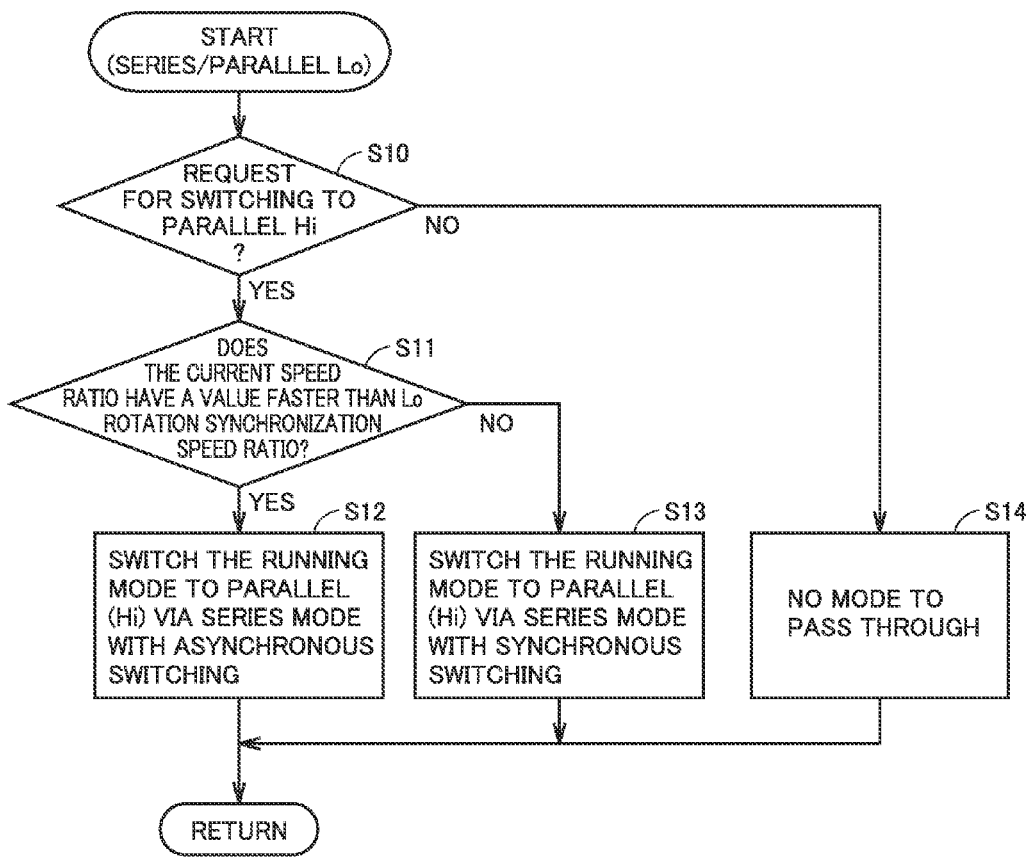
FIG. 15 is a flowchart of a process of a switching control performed in switching to a parallel (Hi) mode.

Hereinafter, reference will be made to FIG. 15 to describe a control process performed by control device 100 in the present embodiment in switching a running mode from the series/parallel (Lo) mode to the parallel (Hi) mode.

In step (hereafter denoted as "S") 10, control device 100 determines whether there is a request to switch a running mode to the parallel (Hi) mode. Control device 100 determines whether there is a request to switch a running mode to the parallel (Hi) mode, based on vehicular speed, vehicular load, and the maps shown in FIG. 12 and FIG. 13. When control device 100 determines that there is a request to switch a running mode to the parallel (Hi) mode (YES in S10), the control proceeds to S11. Otherwise (NO in S10), the control proceeds to S14.

In S11, control device 100 determines whether the current speed ratio has a value faster than a Lo rotation synchronization speed ratio. Control device 100 calculates the current speed ratio for example based on the rotation speed of engine 10 and the rotation speed of ring gear R2 of differential unit 50. The Lo rotation synchronization speed ratio is a speed ratio (a first speed ratio) applied when the parallel (Lo) mode is selected. Note that control device 100 may calculate the rotation speed of ring gear R2 of differential unit 50 for example based on the rotation speed of second MG 30. When control device 100 determines that the current speed ratio has a value faster than the Lo rotation synchronization speed ratio (YES in S11), the control proceeds to S12. Otherwise (NO in S11), the control proceeds to S13.

In S12, control device 100 switches the running mode from the series/parallel (Lo) mode to the parallel (Hi) mode via the series mode with asynchronous switching. Specifically, control device 100 switches the running mode from the series/parallel (Lo) mode to the series mode without performing a synchronous control described hereinafter (see the (B)-(a) combination indicated in FIG. 14). After control device 100 has switched the running mode to the series mode, control device 100 switches the running mode from the series mode to the parallel (Hi) mode (see the (A)-(e) combination indicated in FIG. 14).

In S13, control device 100 switches the running mode from the series/parallel (Lo) mode to the parallel (Hi) mode via the series mode with synchronous switching.

Specifically, control device 100 performs a first synchronous control to synchronize the current speed ratio with the first speed ratio applied in the parallel (Lo) mode. Control device 100 switches the running mode to the series mode at a time point when the current speed ratio synchronizes with the first speed ratio. After control device 100 has switched the running mode to the series mode, control device 100 performs the second synchronous control to synchronize the speed ratio with the second speed ratio applied in the parallel (Hi) mode. Control device 100 switches the running mode to the parallel (Hi) mode at a time point when the current speed ratio synchronizes with the second speed ratio.

In S14, control device 100 does not switch the running mode to the parallel (Hi) mode via the series mode.

Figure 16:
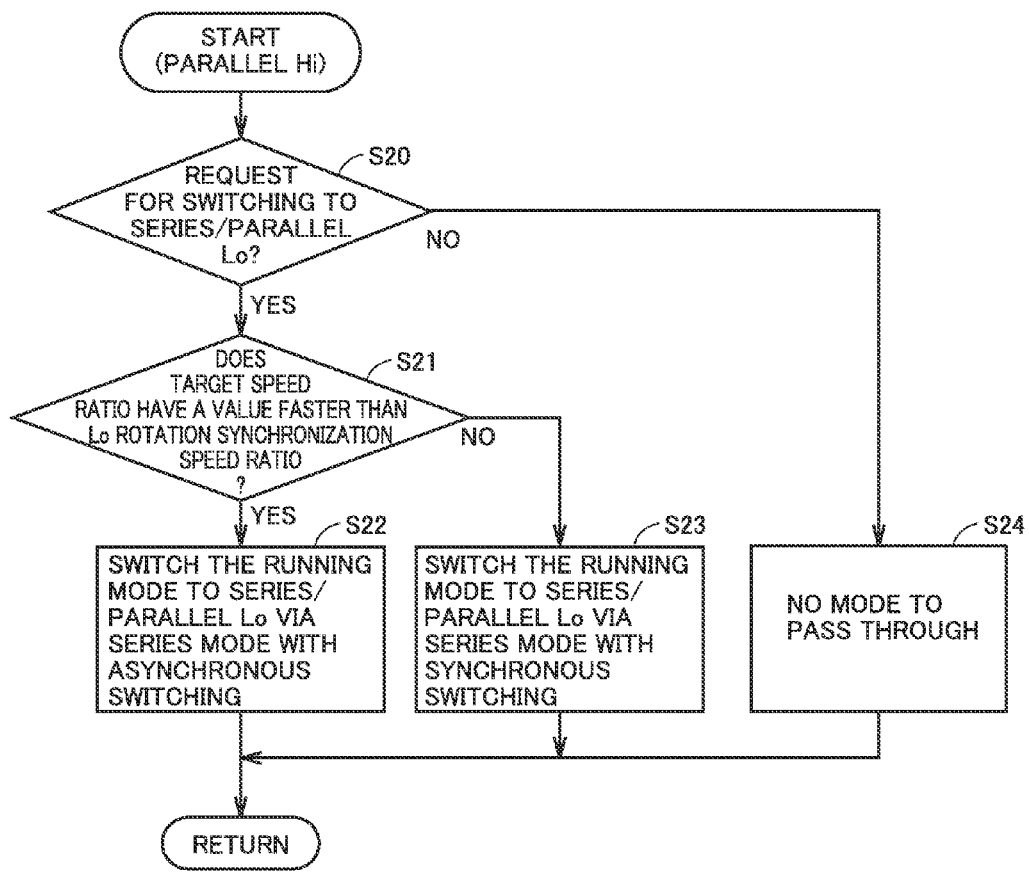
FIG. 16 is a flowchart of a process of a switching control performed in switching to a series/parallel (Lo) mode.

Hereinafter, reference will be made to FIG. 16 to describe a control process performed by control device 100 in the present embodiment in switching a running mode from the parallel (Hi) mode to the series/parallel (Lo) mode.

In step 20, control device 100 determines whether there is a request to switch a running mode to the series/parallel (Lo) mode. Control device 100 determines whether there is a request to switch a running mode to the series/parallel (Lo) mode, based on vehicular speed, vehicular load, and the maps shown in FIG. 12 and FIG. 13. When control device 100 determines that there is a request to switch a running mode to the series/parallel (Lo) mode (YES in S20), the control proceeds to S21. Otherwise (NO in S20), the control proceeds to S24.

In S21, control device 100 determines whether a target speed ratio has a value faster than the Lo rotation synchronization speed ratio. Control device 100 determines the target speed ratio, based on a running mode after switching, and a running state of hybrid vehicle 1, for example. When control device 100 determines that the target speed ratio has a value faster than the Lo rotation synchronization speed ratio (YES in S21), the control proceeds to S22. Otherwise (NO in S21), the control proceeds to S23.

In S22, control device 100 switches the running mode from the parallel (Hi) mode to the series/parallel (Lo) mode via the series mode with asynchronous switching. Specifically, control device 100 switches the running mode from the parallel (Hi) mode to the series mode without performing a synchronous control described hereinafter (see the (E)-(a) combination indicated in FIG. 14). After control device 100 has switched the running mode to the series mode, control device 100 switches the running mode from the series mode to the series/parallel (Lo) mode (see the (A)-(b) combination indicated in FIG. 14).

In S23, control device 100 switches the running mode from the parallel (Hi) mode to the series/parallel (Lo) mode via the series mode with synchronous switching.

Specifically, after control device 100 has switched the running mode from the parallel (Hi) mode to the series mode, control device 100 performs the first synchronous control to synchronize the current speed ratio with the first speed ratio applied in the parallel (Lo) mode. Control device 100 switches the running mode to the series/parallel (Lo) mode at a time point when the current speed ratio synchronizes with the first speed ratio. After control device 100 has switched the running mode to the series/parallel (Lo) mode, control device 100 performs the second synchronous control to control first MG 20 so that the current speed ratio attains the target speed ratio.

In S24, control device 100 does not switch the running mode to the parallel (Lo) mode via the series mode.

Reference will now be made to FIGS. 17-22 to describe an operation of control device 100 in the present embodiment based on the above structure and flowchart.

Figure 17:
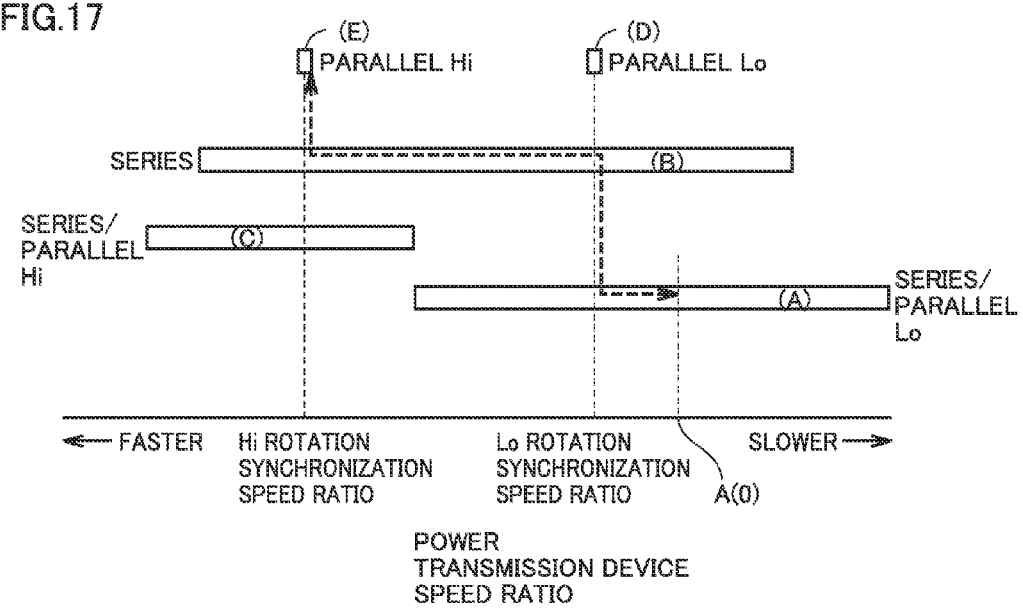
FIG. 17 is a diagram (1) representing variation in speed ratio when performing a synchronous control and also switching a running mode.

FIG. 17 shows variation in speed ratio in switching a running mode between the series/parallel (Lo) mode and the parallel (Hi) mode via the series mode with synchronous control. In FIG. 17, the axis of abscissa represents speed ratio. In FIG. 17, a rectangular area (A) corresponding to the series/parallel (Lo) mode represents a range of speed ratios allowing a speed ratio to be changed thereto when the series/parallel (Lo) mode is selected. In FIG. 17, a rectangular area (B) corresponding to the series mode represents a range of speed ratios allowing a speed ratio to be changed thereto when the series mode is selected. In FIG. 17, a rectangular area (C) corresponding to the series/parallel (Hi) mode represents a range of speed ratios allowing a speed ratio to be changed thereto when the series/parallel (Hi) mode is selected. In FIG. 17, a rectangular area (D) corresponding to the parallel (Lo) mode represents the first speed ratio applied in the parallel (Lo) mode (i.e., the Lo rotation synchronization speed ratio). In FIG. 17, a rectangular area (E) corresponding to the parallel (Hi) mode represents the second speed ratio applied in the parallel (Hi) mode (i.e., the Hi rotation synchronization speed ratio).

As represented in FIG. 17, the range of speed ratios applied in the series/parallel (Lo) mode to allow a speed ratio to be changed thereto includes the first speed ratio applied in the parallel (Lo) mode, but does not include the second speed ratio applied in the parallel (Hi) mode. Similarly, the range of speed ratios applied in the series/parallel (Hi) mode to allow a speed ratio to be changed thereto includes the second speed ratio applied in the parallel (Hi) mode, but does not include the first speed ratio applied in the parallel (Lo) mode. In contrast, the range of speed ratios applied in the series mode to allow a speed ratio to be changed thereto includes both the first speed ratio applied in the parallel (Lo) mode and the second speed ratio applied in the parallel (Hi) mode.

For example, let us assume that the current running mode is the series/parallel (Lo) mode and that the current speed ratio is A(0) having a value slower than the Lo rotation synchronization speed ratio.

When it is determined that there is a request to switch a running mode to the parallel (Hi) mode, based on vehicular speed, vehicular load, and the maps shown in FIG. 12 and FIG. 13 (YES in S10), with the current speed ratio having a value slower than the Lo rotation synchronization speed ratio (No in S11), the running mode is switched to the parallel (Hi) mode via the series mode with synchronous switching (S13).

When control device 100 switches the running mode to the parallel (Hi) mode via the series mode with synchronous switching, control device 100 changes the speed ratio along the route indicated in FIG. 17 by a broken-line arrow. Specifically, control device 100 initially synchronizes the speed ratio with the Lo rotation synchronization speed ratio. Control device 100 switches the running mode from the series/parallel (Lo) mode to the series mode at a time point when the speed ratio synchronizes with the Lo rotation synchronization speed ratio. After control device 100 has switched the running mode to the series mode, control device 100 synchronizes the speed ratio with the Hi rotation synchronization speed ratio. Control device 100 switches the running mode from the series mode to the parallel (Hi) mode at a time point when the speed ratio synchronizes with the Hi rotation synchronization speed ratio.

Figure 18:
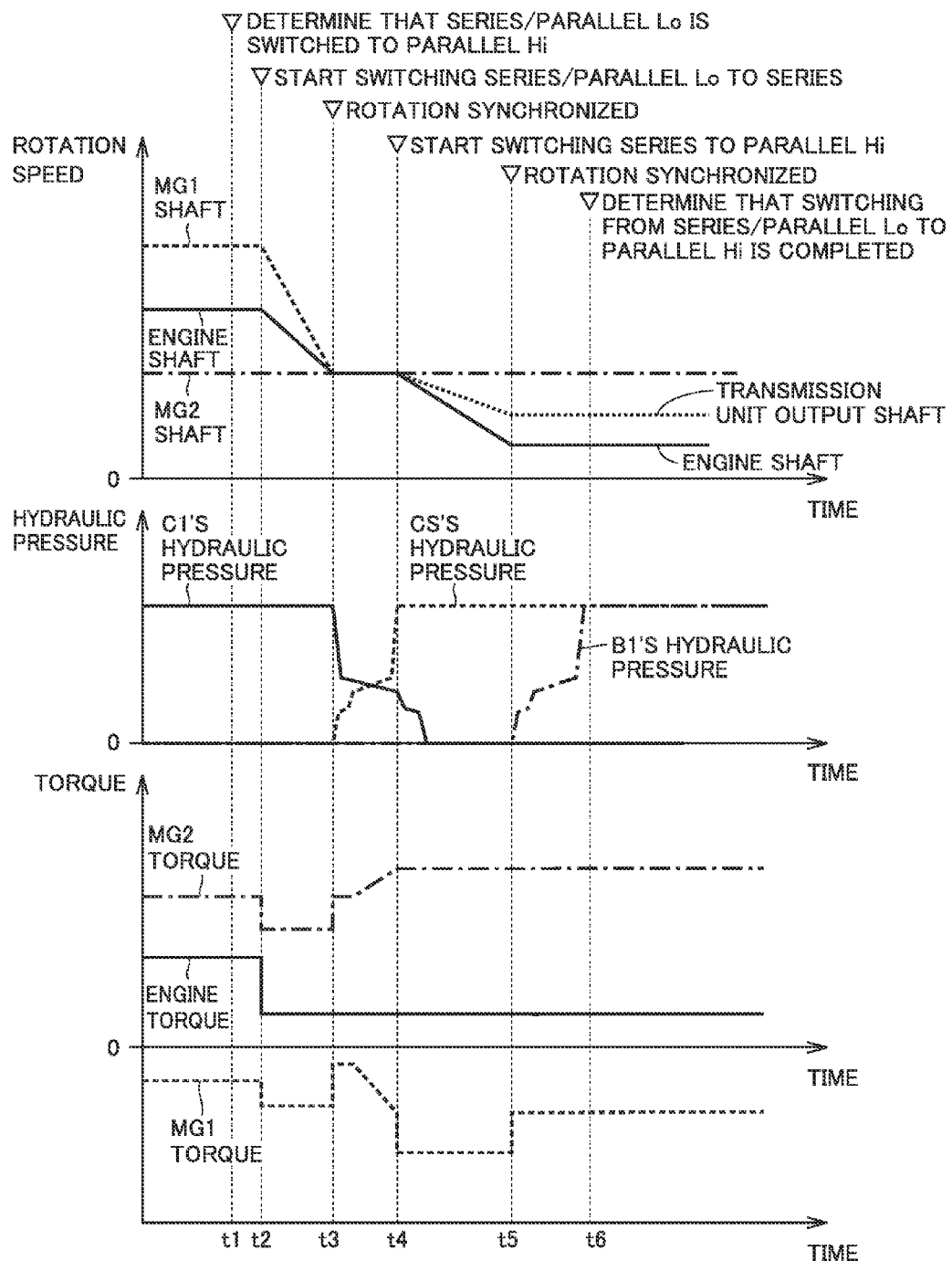
FIG. 18 is timing plots for illustrating a switching control involving a synchronous control, that is performed when switching to the parallel (Hi) mode as the synchronous control is performed.

Reference will now be made to FIG. 18 to describe how each rotation element's operation, each engagement element's operation, and each power source's output torque vary in switching a running mode to the parallel (Hi) mode via the series mode with synchronous switching. Note that a fixed accelerator pedal position is applied for the sake of illustration.

In FIG. 18, the top graph is a timing plot representing how the rotation speed of each rotation element (i.e., the rotation shaft of first MG 20, the output shaft of engine 10, and the rotation shaft of second MG 30) varies with time. The top graph in FIG. 18 has an axis of ordinate representing rotation speed and an axis of abscissa representing time.

In FIG. 18, the middle graph is a timing plot representing how the hydraulic pressure supplied to each engagement element (i.e., clutch C1, brake B1, and clutch CS) varies with time. The middle graph in FIG. 18 has an axis of ordinate representing hydraulic pressure and an axis of abscissa representing time.

In FIG. 18, the bottom graph is a timing plot representing how the output torque of each power source (i.e., engine 10, first MG 20, and second MG 30) varies with time. The bottom graph in FIG. 18 has an axis of ordinate representing torque and an axis of abscissa representing time.

At time t1, it is determined that there is a request to switch the series/parallel (Lo) mode to the parallel (Hi) mode, and in response, at time t2, switching from the series/parallel (Lo) mode to the series mode starts. At the time, the torque (a negative torque) of first MG 20 is increased in the negative direction to decrease the rotation speed of engine 10. As the rotation speed of engine 10 is decreased, an inertial torque is discharged to the driving wheel 90 side, and accordingly, the torque of second MG 30 is decreased. As the rotation speed of engine 10 is decreased, the speed ratio varies to approach the Lo rotation synchronization speed ratio.

At time t3, the current speed ratio synchronizes with the Lo rotation synchronization speed ratio, and at that time point, the torque of first MG 20 is decreased in the positive direction to maintain a synchronous state. At the time, the hydraulic pressure supplied to clutch C1 is decreased to place clutch C1 in the released state and the hydraulic pressure supplied to clutch CS is increased to place clutch CS in the engaged state.

At time t4, the hydraulic pressure of clutch CS increases to an upper limit value, and shifting to the series mode is thus completed. Once shifting to the series mode has been completed, switching to the parallel (Hi) mode starts. When switching to the parallel (Hi) mode is started, the negative torque of first MG 20 is increased in the negative direction to further decrease the rotation speed of engine 10. Accordingly, the speed ratio varies to approach the Hi rotation synchronization speed ratio. At the time, the output shaft of engine 10 has been disconnected from driving wheel 90, and no inertial torque is discharged.

At time t5, the current speed ratio synchronizes with the Hi rotation synchronization speed ratio, and at that time point, the negative torque of first MG 20 is decreased in the positive direction to maintain a synchronous state. At the time, the hydraulic pressure supplied to brake B1 is increased to place brake B1 in the engaged state. Then, at time t6, switching to the parallel (Hi) mode is completed.

Figure 19:
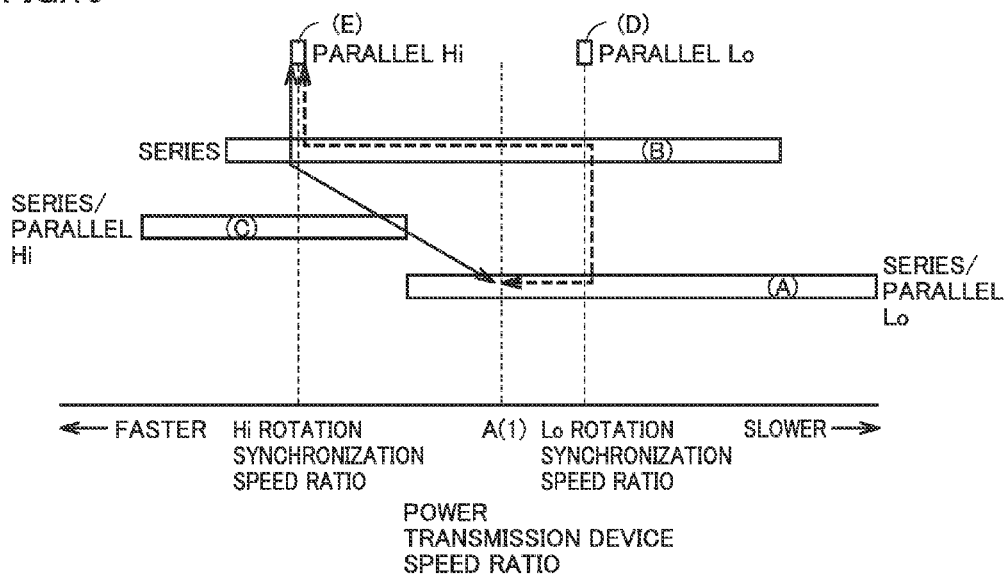
FIG. 19 is a diagram (1) representing variation in speed ratio when switching a running mode without performing the synchronous control.

FIG. 19 shows variation in speed ratio in switching a running mode between the series/parallel (Lo) mode and the parallel (Hi) mode via the series mode with asynchronous control. The axis of abscissa and rectangular areas (A) to (E) indicated in FIG. 19 are similar to those indicated in FIG. 17, and accordingly, they will not be described repeatedly.

For example, let us assume that the current running mode is the series/parallel (Lo) mode and that the current speed ratio is A(1) having a value faster than the Lo rotation synchronization speed ratio.

When it is determined that there is a request to switch the current running mode to the parallel (Hi) mode, based on vehicular speed, vehicular load, and the maps shown in FIG. 12 and FIG. 13 (YES in S10), with the current speed ratio having a value faster than the Lo rotation synchronization speed ratio (YES in S11), the running mode is switched to the parallel (Hi) mode via the series mode with asynchronous switching (S12).

When control device 100 switches the running mode to the parallel (Hi) mode via the series mode with asynchronous switching, then, as indicated in FIG. 19 by a solid-line arrow, control device 100 does not synchronize the current speed ratio with the Lo rotation synchronization speed ratio, and instead switches the running mode from the series/parallel (Lo) mode to the series mode with the Hi rotation synchronization speed ratio set as a target speed ratio. After control device 100 has switched the running mode to the series mode, control device 100 switches the running mode from the series mode to the parallel (Hi) mode.

Figure 20:
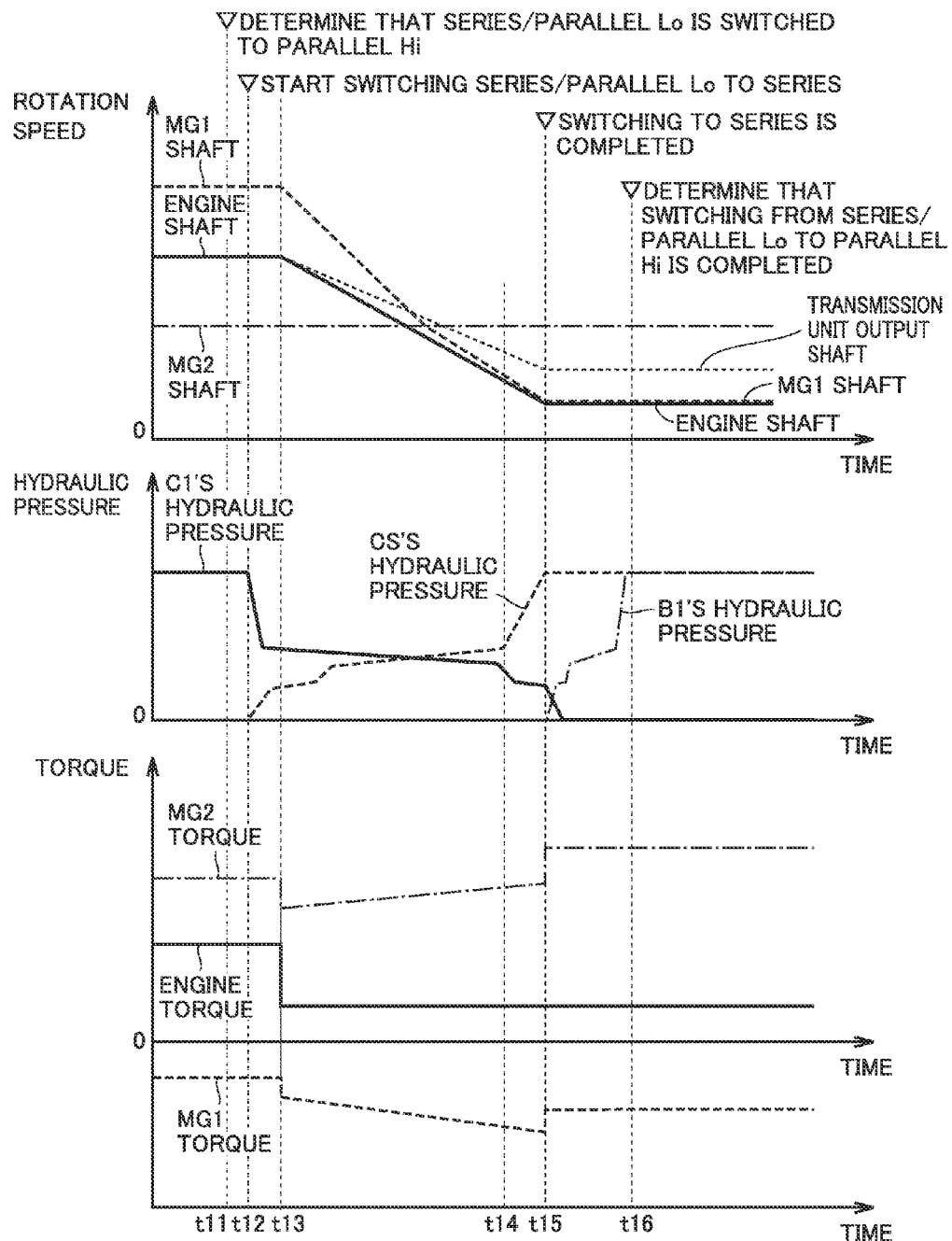
FIG. 20 is timing plots for illustrating a switching control performed when switching to the parallel (Hi) without involving the synchronous control.

Reference will now be made to FIG. 20 to describe how each rotation element's operation, each engagement element's operation, and each power source's output torque vary in switching a running mode to the parallel (Hi) mode via the series mode with asynchronous switching. Note that a fixed accelerator pedal position is applied for the sake of illustration. In FIG. 20, the top, middle and bottom graphs represent targets of operations, which are identical to the targets of operations represented in the top, middle and bottom graphs of FIG. 18, and accordingly will not be described repeatedly.

At time t11, it is determined that there is a request to switch the current mode from the series/parallel (Lo) mode to the parallel (Hi) mode, and in response, at time t2, switching from the series/parallel (Lo) mode to the series mode starts. At the time, the hydraulic pressure supplied to clutch C1 is decreased to a prescribed hydraulic pressure to place clutch C1 in a half-engaged state, and thereafter the hydraulic pressure is gently decreased. Furthermore, together with decreasing the hydraulic pressure of clutch C1, supplying clutch CS with hydraulic pressure starts. While the hydraulic pressure of clutch C1 gently decreases, the hydraulic pressure of clutch CS is gently increased.

At time t13, the torque (a negative torque) of first MG 20 is increased in the negative direction to decrease the rotation speed of engine 10. As the rotation speed of engine 10 is decreased, an inertial torque is discharged to the driving wheel 90 side, and accordingly, the torque of second MG 30 is decreased to correspond to the increase of the torque of first MG 20 in the negative direction.

At time t14, once a predetermined period of time has elapsed since time t13 or when the rotation speed of engine 10 and the rotation speed corresponding to the Hi rotation synchronization speed ratio have a difference smaller in magnitude than a threshold value, the hydraulic pressure of clutch CS is increased at a rate of change larger than that applied to the hydraulic pressure of clutch CS before time t14.

At time t15, the hydraulic pressure of clutch CS increases to an upper limit value, and shifting to the series mode is thus completed. Once shifting to the series mode has been completed, switching to the parallel (Hi) mode starts. Once switching to the parallel (Hi) mode has been started, the hydraulic pressure supplied to brake B1 is increased to place brake B1 in the engaged state. Then, at time t16, switching to the parallel (Hi) mode is completed.

Next, let us assume that the current running mode is the parallel (Hi) mode. When it is determined that there is a request to switch the current running mode to the series/parallel (Lo) mode, based on vehicular speed, vehicular load, and the maps shown in FIG. 12 and FIG. 13 (YES in S20), and the target speed ratio after the running mode has been switched to the series/parallel (Lo) mode has a value slower than the Lo rotation synchronization speed ratio (NO in S21), the running mode is switched from the parallel (Hi) mode to the series/parallel (Lo) mode via the series mode with synchronous switching (S23).

When control device 100 switches the running mode to the parallel (Hi) mode via the series mode with synchronous switching, control device 100 changes the speed ratio along the route indicated in FIG. 17 by a broken-line arrow. More specifically, control device 100 initially switches the running mode from the parallel (Hi) mode to the series mode, and thereafter performs the first control to synchronize the current speed ratio with the Lo rotation synchronization speed ratio. Control device 100 switches the running mode from the series mode to the series/parallel (Lo) mode at a time point when the speed ratio synchronizes with the Lo rotation synchronization speed ratio. After control device 100 has switched the running mode to the series/parallel (Lo) mode, control device 100 performs the second control to change the speed ratio to the target speed ratio.

In contrast, when the target speed ratio after the running mode has been switched to the series/parallel (Lo) mode has a value faster than the Lo rotation synchronization speed ratio (YES in S21), the running mode is switched from the parallel (Hi) mode to the series/parallel (Lo) mode via the series mode with asynchronous switching (S22).

When control device 100 switches the running mode to the series/parallel (Lo) mode via the series mode with asynchronous switching, then, as indicated in FIG. 19 by a solid-line arrow, control device 100 switches the running mode from the parallel (Hi) mode to the series mode, then switches the running mode from the series mode to series/parallel (Lo) mode without performing the first control, and thereafter performs the second control to change the speed ratio to the target speed ratio.

Thus, according to the hybrid vehicle according to the present embodiment, when a running mode is switched between a series/parallel running mode and a parallel running mode and a shift position is also switched between a low speed position and a high speed position, the running mode can be switched via a series running mode so that an increase in the number of control elements to be simultaneously controlled can be suppressed as compared with a case in which a running mode and a shift position are switched, and speed change control can thus be facilitated. A hybrid vehicle can thus be provided that allows a clutch to be controlled to be engaged/disengaged and allows a transmission unit to be controlled to change speed, as appropriate, in switching a running mode.

Furthermore, when control device 100 switches a state in which one of a low speed position and a high speed position is created in the series/parallel mode to a state in which the other shift position is created in the parallel mode via the series mode, control device 100 can perform the first synchronous control and the second synchronous control to smoothly switch a running mode and a shift position (see the broken-line arrow of FIG. 17).

Furthermore, when a direction in which a rotation speed ratio changes by the first synchronous control is opposite to a direction in which the rotation speed ratio changes by the second synchronous control (see the broken-line arrow of FIG. 19), control device 100 switches the series/parallel mode to the series mode without performing the first synchronous control, and can thus suppress an increase/decrease of a speed ratio in switching a running mode. This can suppress deterioration of vehicular drivability.

Furthermore, when control device 100 switches a state in which one of a low speed position and a high speed position is created in the parallel mode to a state in which the other shift position is created in the series/parallel mode via the series mode, control device 100 can perform the first control and the second control to smoothly switch a running mode and a shift position (see the broken-line arrow of FIG. 17).

Furthermore, when a direction in which a rotation speed ratio changes by the first control is opposite to a direction in which the rotation speed ratio changes by the second control (see the broken-line arrow of FIG. 19), control device 100 switches the series running mode to the parallel running mode without performing the first control, and can thus suppress an increase/decrease of a speed ratio in switching a running mode. This can suppress deterioration of vehicular drivability.

Hereinafter, an exemplary variation will be described.

While the present embodiment has been described for a case in which a running mode is switched between the series/parallel (Lo) mode and the parallel (Hi) mode by way of example, switching a running mode between the series/parallel (Hi) mode and the parallel (Lo) mode can also be done similarly via the series mode so that an increase in the number of control elements to be simultaneously controlled can be suppressed and speed change control can thus be facilitated.

Figure 21:
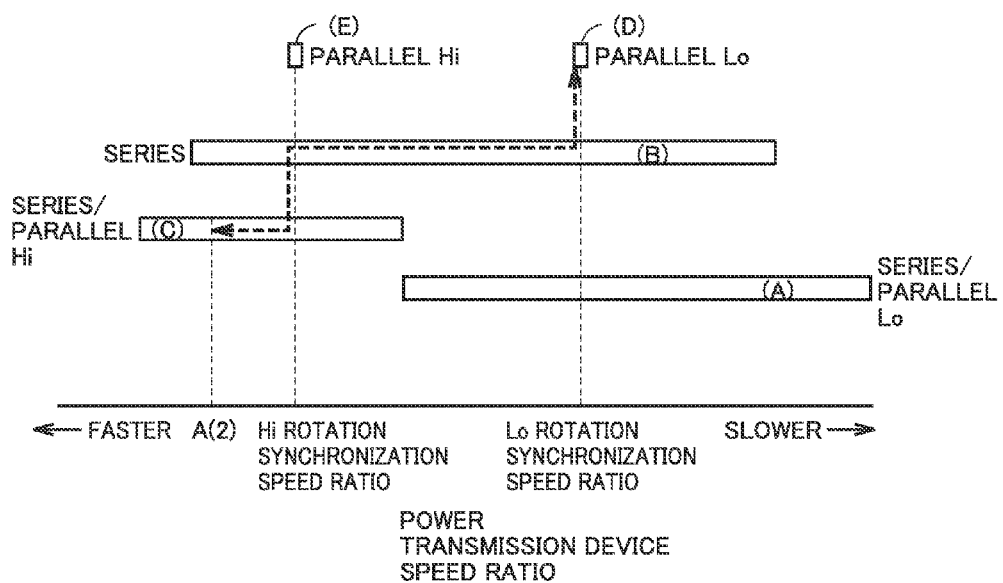
FIG. 21 is a diagram (2) representing variation in speed ratio when performing the synchronous control and also switching a running mode.

FIG. 21 shows variation in speed ratio in switching a running mode between the series/parallel (Hi) mode and the parallel (Lo) mode via the series mode with synchronous switching. The axis of abscissa and rectangular areas (A) to (E) indicated in FIG. 21 are similar to those indicated in FIG. 17, and accordingly, they will not be described repeatedly.

As represented in FIG. 21, the range of speed ratios applied in the series/parallel (Lo) mode to allow a speed ratio to be changed thereto includes the first speed ratio applied in the parallel (Lo) mode, but does not include the second speed ratio applied in the parallel (Hi) mode. Similarly, the range of speed ratios applied in the series/parallel (Hi) mode to allow a speed ratio to be changed thereto includes the second speed ratio applied in the parallel (Hi) mode, but does not include the first speed ratio applied in the parallel (Lo) mode. In contrast, the range of speed ratios applied in the series mode to allow a speed ratio to be changed thereto includes both the first speed ratio applied in the parallel (Lo) mode and the second speed ratio applied in the parallel (Hi) mode.

For example, let us assume that the current running mode is the series/parallel (Hi) mode and that the current speed ratio is A(2) having a value faster than the Hi rotation synchronization speed ratio.

When it is determined that there is a request to switch a running mode to the parallel (Lo) mode, based on vehicular speed, vehicular load, and the maps shown in FIG. 12 and FIG. 13, with the current speed ratio having a value faster than the Hi rotation synchronization speed ratio, the running mode is switched to the parallel (Lo) mode via the series mode with synchronous switching.

When control device 100 switches the running mode to the parallel (Lo) mode via the series mode with synchronous switching, control device 100 changes the speed ratio along the route indicated in FIG. 21 by a broken-line arrow. Specifically, control device 100 initially synchronizes the speed ratio with the Hi rotation synchronization speed ratio. Control device 100 switches the running mode from the series/parallel (Hi) mode to the series mode at a time point when the speed ratio synchronizes with the Hi rotation synchronization speed ratio. After control device 100 has switched the running mode to the series mode, control device 100 synchronizes the speed ratio with the Lo rotation synchronization speed ratio. Control device 100 switches the running mode from the series mode to the parallel (Lo) mode at a time point when the speed ratio synchronizes with the Lo rotation synchronization speed ratio. This allows the running mode and the shift position to be switched smoothly.

Figure 22:
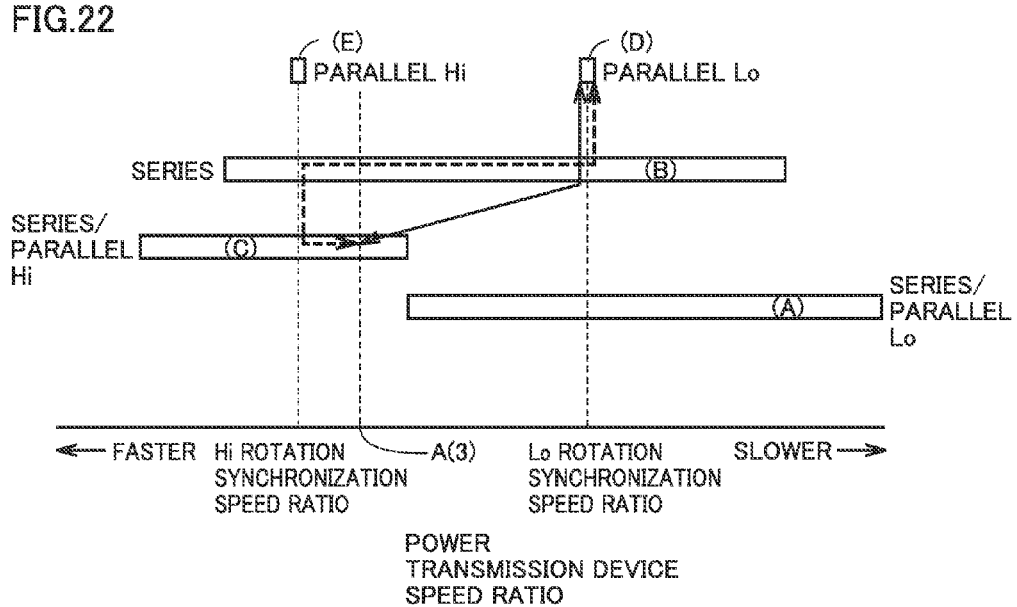
FIG. 22 is a diagram (2) representing variation in speed ratio when switching a running mode without performing the synchronous control.

FIG. 22 shows variation in speed ratio in switching a running mode between the series/parallel (Hi) mode and the parallel (Lo) mode via the series mode with asynchronous switching. The axis of abscissa and rectangular areas (A) to (E) indicated in FIG. 22 are similar to those indicated in FIG. 17, and accordingly, they will not be described repeatedly.

For example, let us assume that the current running mode is the series/parallel (Hi) mode and that the current speed ratio is A(3) having a value slower than the Hi rotation synchronization speed ratio.

When it is determined that there is a request to switch the current running mode to the parallel (Lo) mode, based on vehicular speed, vehicular load, and the maps shown in FIG. 12 and FIG. 13, with the current speed ratio having a value slower than the Hi rotation synchronization speed ratio, the running mode is switched to the parallel (Lo) mode via the series mode with asynchronous switching.

When control device 100 switches the running mode to the parallel (Lo) mode via the series mode with asynchronous switching, Then, as indicated in FIG. 22 by a solid-line arrow, control device 100 does not synchronize the current speed ratio with the Hi rotation synchronization speed ratio, and instead switches the running mode from the series/parallel (Hi) mode to the series mode with the Lo rotation synchronization speed ratio set as a target speed ratio. After control device 100 has switched the running mode to the series mode, control device 100 switches the running mode from the series mode to the parallel (Lo) mode. This can suppress an increase/decrease of a speed ratio in switching a running mode (see a broken-line arrow and a solid-line arrow indicated in FIG. 22). This can suppress deterioration of vehicular drivability.

Next, let us assume that the current running mode is the parallel (Lo) mode. When it is determined that there is a request to switch a running mode to the series/parallel (Hi) mode, based on vehicular speed, vehicular load, and the maps shown in FIG. 12 and FIG. 13, and the target speed ratio after the running mode has been switched to the series/parallel (Hi) mode has a value faster than the Hi rotation synchronization speed ratio, the running mode is switched from the parallel (Lo) mode to the series/parallel (Hi) mode via the series mode with synchronous switching.

When control device 100 switches the running mode to the series/parallel (Hi) mode via the series mode with synchronous switching, control device 100 changes the speed ratio along the route indicated in FIG. 21 by a broken-line arrow. More specifically, control device 100 initially switches the running mode from the parallel (Lo) mode to the series mode, and thereafter synchronizes the current speed ratio with the Hi rotation synchronization speed ratio. Control device 100 switches the running mode from the series mode to the series/parallel (Hi) mode at a time point when the speed ratio synchronizes with the Hi rotation synchronization speed ratio. After control device 100 has switched the running mode to the series/parallel (Hi) mode, control device 100 changes the speed ratio to the target speed ratio.

In contrast, when the target speed ratio after the running mode has been switched to the series/parallel (Hi) mode has a value slower than the Hi rotation synchronization speed ratio, the running mode is switched from the parallel (Lo) mode to the series/parallel (Hi) mode via the series mode with asynchronous switching. This allows the running mode to be smoothly switched to the series/parallel (Hi) mode.

When control device 100 switches the running mode to the series/parallel (Hi) mode via the series mode with asynchronous switching, Then, as indicated in FIG. 22 by a solid-line arrow, control device 100 switches the running mode from the parallel (Lo) mode to the series mode, then switches the running mode from the series mode to the series/parallel (Hi) mode without controlling the speed ratio to synchronize with the Hi rotation synchronization speed ratio, and thereafter changes the speed ratio to the target speed ratio. This can suppress such an increase of a speed ratio in switching a running mode to the series/parallel (Hi) mode as indicated in FIG. 22 by a broken-line arrow.

Furthermore, while the present embodiment has been described such that when a running mode is switched in the aforementioned, predetermined combinations, whether the running mode is switched via the series mode with synchronous switching or via the series mode with asynchronous switching is determined depending on the current speed ratio or the target speed ratio, for example, for a vehicular load higher than a threshold value set based on heat loss, control device 100 may switch a running mode via the series mode with synchronous switching, whereas for a vehicular load lower than the threshold value, control device 100 may switch a running mode via the series mode with asynchronous switching.

When switching a running mode via the series mode with synchronous switching is compared with switching a running mode via the series mode with asynchronous switching, the former involves more routes to pass a current and hence has a larger electrical heat loss than the latter. In contrast, switching a running mode via the series mode with asynchronous switching generates mechanical heat loss resulting from causing an engagement element to slip. This mechanical heat loss tends to be larger for higher vehicular load. Accordingly, by setting a threshold value to a value for which the mechanical heat loss exceeds the electrical heat loss, an increase of heat loss caused in switching a running mode can be suppressed.

Figure 23:
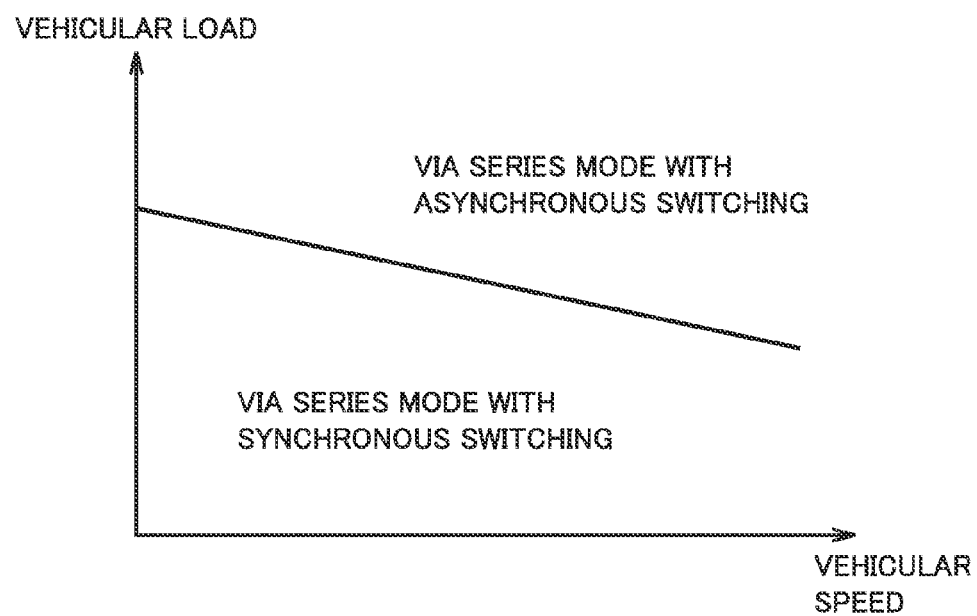
FIG. 23 is a map for determining whether to perform the synchronous control depending on the vehicular load.

Note that control device 100 may refer to such a map as shown in FIG. 23, vehicular speed and vehicular load in determining whether a running mode is switched via the series mode with synchronous switching or via the series mode with asynchronous switching. In FIG. 23 the axis of ordinate represents vehicular load and the axis of abscissa represents vehicular speed. In FIG. 23, a threshold value linearly varying relative to vehicular speed is set. Note that the threshold value represented in FIG. 23 is merely one example and not limited to being linear, and may be non-linear for example. As represented in FIG. 23, the threshold value is set to be smaller for higher vehicular speed.

Alternatively, control device 100 may switch a running mode via the series mode with asynchronous switching when a control mode is selected such as a sport mode selected when the driver demands a high driving force response.

Switching a running mode via the series mode with synchronous switching needs to sequentially implement synchronization of a speed ratio and changing an engaged/disengaged state of an engagement element, and may thus require a longer period of time to start and complete the switching than switching a running mode via the series mode with asynchronous switching. When a control mode such as the sport mode is selected, switching a running mode via the series mode with asynchronous switching allows the running mode to be rapidly switched. This can suppress deterioration of response of driving force.

Alternatively, control device 100 may switch a running mode via the series mode with synchronous switching when a control mode is selected such as a comfort mode selected when the driver requests that the vehicle run relatively quietly.

When switching a running mode via the series mode with asynchronous switching is compared with switching a running mode via the series mode with synchronous switching, the former causes a hydraulically controlled engagement element to slip in switching the running mode, and may thus cause the vehicle to vibrate. When a control mode such as the comfort mode is selected, switching a running mode via the series mode with synchronous switching can be applied to allow suppressed vibration or the like.

Alternatively, control device 100 may switch a running mode via the series mode with synchronous switching in response to an oil temperature lower than a threshold value.

When a hydraulic multiple disk clutch is used as an engagement element, controllability may be impaired in a low-temperature environment. In such a condition, when the engagement element is caused to slip, the vehicle may be vibrated or the like. Accordingly, for an oil temperature lower than the threshold value and thus falling within a temperature range impairing controllability, switching a running mode via the series mode with synchronous switching allows suppressed vibration and the like.

Alternatively, for a vehicular load higher than a threshold value set based on a rated output of first MG 20, control device 100 may switch a running mode via the series mode with asynchronous switching.

When switching a running mode via the series mode with synchronous switching is compared with switching a running mode via the series mode with asynchronous switching, the former may have an increased input/output power of first MG 20. When a vehicular load has a value exceeding the rated output of first MG 20, switching a running mode via the series mode with asynchronous switching can suppress an operation of first MG 20 exceeding the rated output.

Alternatively, when first MG 20 or an inverter that drives first MG 20 has temperature higher than a threshold value, control device 100 may switch a running mode via the series mode with asynchronous switching. Alternatively, when at least any one of clutch C1, brake B1 and clutch CS has temperature higher than a threshold value, control device 100 may switch a running mode via the series mode with synchronous switching. This can prevent equipment used in switching a running mode from having high temperature.

Furthermore, when control device 100 switches a running mode via the series mode with synchronous switching and the rotation speed of engine 10 also increases and decreases, then, while the rotation speed of engine 10 increases and decreases (or in a period of time elapsing after switching the running mode is started before doing so is completed) a meter provided at the driver's seat and displaying how the rotation speed of engine 10 varies may display the variation such that it changes only to one side of an increasing side and a decreasing side or alternatively a speaker provided at the driver's seat may output a prescribed operating sound so that how the operating sound of engine 10 varies can be heard to vary to only one side of increased rotation speed of engine 10 and decreased rotation speed of engine 10. This allows increase and decrease in rotation speed of engine 10 to be less perceptible by the driver and can thus prevent the driver from feeling uncomfortable with the vehicle's behavior.

It should be understood that the embodiments disclosed herein have been described for the purpose of illustration only and in a non-restrictive manner in any respect. The scope of the present invention is defined by the terms of the claims, and is intended to include any modifications within the meaning and scope equivalent to the terms of the claims.

What is claimed is:

1. A hybrid vehicle comprising:
an internal combustion engine;
a first rotating electric machine;
a second rotating electric machine configured to output motive power to a driving wheel;
a transmission unit having an input element receiving motive power from the internal combustion engine and an output element outputting the motive power received by the input element, the transmission unit being configured to switch between a non-neutral state and a neutral state, in the non-neutral state motive power being transmitted between the input element and the output element via one shift position of a low speed position and a high speed position, in the neutral state motive power not being transmitted between the input element and the output element and;
a differential unit having a first rotation element connected to the first rotating electric machine, a second rotation element connected to the second rotating electric machine and the driving wheel, and a third rotation element connected to the output element, the differential unit being configured such that when rotation speeds of any two of the first to third rotation elements are determined, rotation speed of the remaining one rotation element is automatically determined,
the hybrid vehicle being configured to transmit the motive power of the internal combustion engine via at least one of a first route and a second route, in the first route the motive power being transmitted from the internal combustion engine via the transmission unit and the differential unit to the first rotating electric machine, in the second route the motive power being transmitted from the internal combustion engine to the first rotating electric machine via a route other than the first route,
the hybrid vehicle further comprising a clutch provided in the second route and configured to switch between an engaged state and a released state, in the engaged state the motive power being transmitted from the internal combustion engine to the first rotating electric machine, in the released state the motive power from the internal combustion engine to the first rotating electric machine being interrupted,
the hybrid vehicle having a running mode including:
(i) a series/parallel running mode placing the clutch in the released state and also placing the transmission unit in the non-neutral state,
(ii) a parallel running mode placing the clutch in the engaged state and also placing the transmission unit in the non-neutral state, and
(iii) a series running mode placing the clutch in the engaged state and also placing the transmission unit in the neutral state,
the hybrid vehicle further comprising a control device configured to switch the running mode and the shift position via the series running mode when the running mode is switched between the series/parallel running mode and the parallel running mode and when the shift position is also switched between the low speed position and the high speed position.

2. The hybrid vehicle according to claim 1, wherein when a state in which the shift position of the low speed position is created in the series/parallel running mode is switched via the series running mode to a state in which the shift position of the high speed position is created in the parallel running mode, and furthermore, when a current running mode is the series/parallel running mode and the shift position of the low speed position is also created, and a current rotation speed ratio of the input element of the transmission unit and the second rotation element of the differential unit has a value slower than a first rotation speed ratio applied when the shift position of the low speed position is created in the parallel running mode, then,
before switching the series/parallel running mode to the series running mode, the control device performs a control to synchronize the rotation speed ratio with the first rotation speed ratio, and
after having switched the series/parallel running mode to the series running mode, the control device performs a control to synchronize the rotation speed ratio with a second rotation speed ratio applied when the shift position of the high speed position is created in the parallel running mode.

3. The hybrid vehicle according to claim 1, wherein when a state in which the shift position of the high speed position is created in the series/parallel running mode is switched via the series running mode to a state in which the shift position of the low speed position is created in the parallel running mode, and furthermore, when a current running mode is the series/parallel running mode and the shift position of the high speed position is also created, and a current rotation speed ratio of the input element of the transmission unit and the second rotation element of the differential unit has a value faster than a first rotation speed ratio applied when the shift position of the high speed position is created in the parallel running mode, then,
before switching the series/parallel running mode to the series running mode, the control device performs a control to synchronize the rotation speed ratio with the first rotation speed ratio, and
after having switched the series/parallel running mode to the series running mode, the control device performs a control to synchronize the rotation speed ratio with a second rotation speed ratio applied when the shift position of the low speed position is created in the parallel running mode.

4. The hybrid vehicle according to claim 1, wherein when a state in which the shift position of the low speed position is created in the series/parallel running mode is switched via the series running mode to a state in which the shift position of the high speed position is created in the parallel running mode, and furthermore, when a current running mode is the series/parallel running mode and the shift position of the low speed position is also created, and a current rotation speed ratio of the input element of the transmission unit and the second rotation element of the differential unit has a value faster than a first rotation speed ratio applied when the shift position of the low speed position is created in the parallel running mode, then,
 the control device switches the running mode from the series/parallel running mode to the series running mode without performing a control to synchronize the rotation speed ratio with the first rotation speed ratio before switching the running mode to the series running mode.

5. The hybrid vehicle according to claim 1, wherein when a state in which the shift position of the high speed position is created in the series/parallel running mode is switched via the series running mode to a state in which the shift position of the low speed position is created in the parallel running mode, and furthermore, when a current running mode is the series/parallel running mode and the shift position of the high speed position is also created, and a current rotation speed ratio of the input element of the transmission unit and the second rotation element of the differential unit has a value slower than a first rotation speed ratio applied when the shift position of the high speed position is created in the parallel running mode, then,
 the control device switches the running mode from the series/parallel running mode to the series running mode without performing a control to synchronize the rotation speed ratio with the first rotation speed ratio before switching the running mode to the series running mode.

6. The hybrid vehicle according to claim 1, wherein when a state in which the shift position of the low speed position is created in the parallel running mode is switched via the series running mode to a state in which the shift position of the high speed position is created in the series/parallel running mode, and furthermore, when a current running mode is the parallel running mode and the shift position of the low speed position is also created, and a target value of a rotation speed ratio of the input element of the transmission unit and the second rotation element of the differential unit has a value faster than a first rotation speed ratio applied when the shift position of the high speed position is created in the parallel running mode, then,
 while in the series running mode, the control device performs a control to synchronize the rotation speed ratio with the first rotation speed ratio, and
 after having switched the series running mode to the series/parallel running mode, the control device performs a control to change the rotation speed ratio to the target value.

7. The hybrid vehicle according to claim 1, wherein when a state in which the shift position of the high speed position is created in the parallel running mode is switched via the series running mode to a state in which the shift position of the low speed position is created in the series/parallel running mode, and furthermore, when a current running mode is the parallel running mode and the shift position of the high speed position is also created, and a target value of a rotation speed ratio of the input element of the transmission unit and the second rotation element of the differential unit has a value slower than a first rotation speed ratio applied when the shift position of the low speed position is created in the parallel running mode, then,
 while in the series running mode, the control device performs a control to synchronize the rotation speed ratio with the first rotation speed ratio, and
 after having switched the series running mode to the series/parallel running mode, the control device performs a control to change the rotation speed ratio to the target value.

8. The hybrid vehicle according to claim 1, wherein when a state in which the shift position of the low speed position is created in the parallel running mode is switched via the series running mode to a state in which the shift position of the high speed position is created in the series/parallel running mode, and furthermore, when a current running mode is the parallel running mode and the shift position of the low speed position is also created, and a target value of a rotation speed ratio of the input element of the transmission unit and the second rotation element of the differential unit has a value slower than a first rotation speed ratio applied when the shift position of the high speed position is created in the parallel running mode, then,
 the control device switches the running mode from the series running mode to the series/parallel running mode without performing a control to synchronize the rotation speed ratio with the first rotation speed ratio while in the series running mode.

9. The hybrid vehicle according to claim 1, wherein when a state in which the shift position of the high speed position is created in the parallel running mode is switched via the series running mode to a state in which the shift position of the low speed position is created in the series/parallel running mode, and furthermore, when a current running mode is the parallel running mode and the shift position of the high speed position is also created, and a target value of a rotation speed ratio of the input element of the transmission unit and the second rotation element of the differential unit has a value faster than a first rotation speed ratio applied when the shift position of the low speed position is created in the parallel running mode, then,
 the control device switches the running mode from the series running mode to the series/parallel running mode without performing a control to synchronize the rotation speed ratio with the first rotation speed ratio while in the series running mode.

* * * * *